US012620067B2

(12) United States Patent (10) Patent No.: US 12,620,067 B2

McIntosh et al. (45) Date of Patent: May 5, 2026

(54) MOTION BLUR FOR MULTILAYER MOTION

(71) Applicant: GoPro, Inc., San Mateo, CA (US)

(72) Inventors: Robert McIntosh, Marina Del Rey, CA (US); David Newman, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 428 days.

(21) Appl. No.: 18/189,186

(22) Filed: Mar. 23, 2023

(65) Prior Publication Data

US 2024/0320803 A1 Sep. 26, 2024

(51) Int. Cl.
| | |
|---|---|
| *G06T 5/70* | (2024.01) |
| *G06T 7/215* | (2017.01) |
| *H04N 23/617* | (2023.01) |
| *H04N 23/68* | (2023.01) |
| *H04N 23/80* | (2023.01) |

(52) U.S. Cl.
CPC .............. *G06T 5/70* (2024.01); *G06T 7/215* (2017.01); *H04N 23/617* (2023.01); *H04N 23/6811* (2023.01); *H04N 23/80* (2023.01); *G06T 2207/10016* (2013.01)

(58) Field of Classification Search
CPC . G06T 5/70; G06T 7/215; G06T 2207/10016; H04N 23/80; H04N 23/617; H04N 23/6811
See application file for complete search history.

(56) References Cited

U.S. PATENT DOCUMENTS

| | | | |
|---|---|---|---|
| 10,958,869 B1 | 3/2021 | Chi | |
| 11,039,079 B1 | 6/2021 | Sandofsky | |
| 2009/0179898 A1* | 7/2009 | Bond ........................ | G06T 5/70 |
| | | | 345/473 |
| 2010/0271512 A1 | 10/2010 | Garten | |
| 2013/0135486 A1 | 5/2013 | Wan | |
| 2013/0208138 A1 | 8/2013 | Li | |
| 2014/0300805 A1 | 10/2014 | Davis | |
| 2015/0312557 A1 | 10/2015 | Kim | |

(Continued)

OTHER PUBLICATIONS

Alvarez, Luis, et al. "Symmetrical dense optical flow estimation with occlusions detection." International Journal of Computer Vision 75 (2007): 371-385.

(Continued)

*Primary Examiner* — Lin Ye
*Assistant Examiner* — Fayez A Bhuiyan
(74) *Attorney, Agent, or Firm* — Wang Hardoon, P.C.

(57) ABSTRACT

Systems, apparatus, and methods for adding post-processing motion blur to video. Conventional post-processing techniques relied on the filmmaker to select and stage their shots. Different motion blur techniques were designed to fix certain types of footage. Vector blur is one technique that "smears" pixel information in the direction of movement. Frame interpolation and stacking attempts to create motion blur by stacking interpolated frames together. Each technique has its own set of limitations. Various embodiments use a combination of motion blur techniques in post-processing for better, more realistic outcomes with faster/more efficient rendering times. In some cases, this may enable adaptive quality post-processing that may be performed in mobile/ embedded ecosystems.

20 Claims, 15 Drawing Sheets

(56) References Cited

U.S. PATENT DOCUMENTS

| | | |
|---|---|---|
| 2017/0302840 A1 | 10/2017 | Hasinoff |
| 2018/0302543 A1 | 10/2018 | Somasundaram |
| 2019/0138889 A1 | 5/2019 | Jiang |
| 2020/0007738 A1 | 1/2020 | Chu |
| 2020/0106945 A1 | 4/2020 | Hsieh |
| 2021/0279840 A1 | 9/2021 | Chi |
| 2021/0337101 A1 | 10/2021 | Yuan |
| 2022/0007040 A1 | 1/2022 | Ward |
| 2022/0038653 A1 | 2/2022 | Reda |
| 2022/0038654 A1 | 2/2022 | Reda |
| 2022/0210467 A1 | 6/2022 | Chen |
| 2022/0270267 A1 | 8/2022 | Ye |
| 2022/0303495 A1 | 9/2022 | Choe |
| 2022/0400226 A1 | 12/2022 | Liang |
| 2023/0140006 A1 | 5/2023 | Song |
| 2023/0224583 A1 | 7/2023 | Newman |
| 2024/0163395 A1 | 5/2024 | Djelouah |
| 2024/0320786 A1 | 9/2024 | Mcintosh |

OTHER PUBLICATIONS

Che, Tongtong, et al. "SDOF-GAN: Symmetric dense optical flow estimation with generative adversarial networks." IEEE Transactions on Image Processing 30 (2021): 6036-6049.

GitHub—98mxr_GMFSS_Fortuna_ All in one place, Jun. 25, 2023, 3 pages.

GitHub—haofeixu_gmflow_ [CVPR 2022 Oral] GMFlow_ Learning Optical Flow via Global Matching Nov. 14, 2022, 8 pages.

GitHub—hyw-dev_GMFSS_ GMFlow based video frame interpolation, Apr. 3, 2023, 3 pages.

GitHub—megvii-research_ECCV2022-RIFE_ ECCV2022—Real-Time Intermediate Flow Estimation for Video Frame Interpolation, Jul. 4, 2022, 8 pages.

Huang, Zhewei, et al. "Real-time intermediate flow estimation for video frame interpolation." European Conference on Computer Vision. Cham: Springer Nature Switzerland, 2022.

Stone, Austin, et al. "Smurf: Self-teaching multi-frame unsupervised raft with full-image warping." Proceedings of the IEEE/CVF conference on Computer Vision and Pattern Recognition. 2021.

Wang, Yang, et al. "Occlusion aware unsupervised learning of optical flow." Proceedings of the IEEE conference on computer vision and pattern recognition. 2018.

Wang, Yang, et al. "Occlusion aware unsupervised learning of optical flow." Proceedings of the IEEE conference on computer vision and pattern recognition. 2018. SLIDES.

Xu, Haofei, et al. "Gmflow: Learning optical flow via global matching." Proceedings of the IEEE/CVF conference on computer vision and pattern recognition. 2022.

SVFI User Guide—Chinese (original) Aug. 18, 2022, 43 pages.

SVFI User Guide—Machine Translation, May 25, 2023, 50 pages.

3GPP TS 23.501 (System Architecture for the 5G System (5GS), version 17.5.0, published Jun. 15, 2022.

3GPP TS 24.501(Non-Access-Stratum (NAS) Protocol for 5G System (5G); Stage 3, version 17.5.0, published Jan. 5, 2022.

Huang et al., Real-Time Intermediate Flow Estimation for Video Frame Interpolation, arXiv:2011.06294v12, submitted Jul. 13, 2022.

Dong, Jiong, Kaoru Ota, and Mianxiong Dong. "Video frame interpolation: A comprehensive survey." ACM Transactions on Multimedia Computing, Communications and Applications 19.2s (2023): 1-31.

Kokaram, Anil, et al. "Motion-based frame interpolation for film and television effects." IET Computer Vision 14.6 (2020): 323-338.

Parihar, Anil Singh, et al. A comprehensive survey on video frame interpolation techniques. The Visual Computer 38.1 (2022): 295-319.

Yang, Xiaohui, et al. "Depth-assisted frame rate up-conversion for stereoscopic video." IEEE Signal Processing Letters 21.4 (2014): 423-427.

* cited by examiner

FIG. 2

FRAME INTERPOLATION 2X

304

VECTOR BLUR

302

FRAME INTERPOLATION 4X

306

FRAME INTERPOLATION 8X

308

FRAME INTERPOLATION 2X
WITH VECTOR BLUR

602

FRAME INTERPOLATION 4X
WITH VECTOR BLUR

604

FRAME INTERPOLATION 8X
WITH VECTOR BLUR

606

MOTION BLUR FOR MULTILAYER MOTION

COPYRIGHT

TECHNICAL FIELD

This disclosure relates generally to the field of digital image capture and post-processing. More particularly, the present disclosure relates to systems, computer programs, devices, and methods for post-processing motion blur.

DESCRIPTION OF RELATED TECHNOLOGY

When a camera captures an image, its sensor is exposed to light for a period of time. A captured image represents the collected light information, from the camera's viewpoint, over the exposure time. Typically, the exposure time is selected to maximize image clarity, but blurs can also be intentionally added to create the impression of motion. Motion blur artifacts smear the image along the direction of relative motion. In other words, the smearing is created by both the object's movement (actual motion) and/or the camera's movement (relative motion).

Certain camera movements (jitter or camera shake) may introduce camera blur for subjects-even for stationary subjects—that is undesirable. Undesirable motion blur can be reduced or removed using stabilization techniques such as mechanical/optical image stabilization and electronic image stabilization (EIS).

In some cases, motion blur may be intentionally manipulated by changing the relative motion between the camera and a target of interest. As but one example, the camera may be panned to track a moving object; in this case, even with long exposure times, the moving objects will appear sharper while the background will become more blurred. This can be used to convey a sense of the viewer's movement and speed.

Professional and amateur filmmakers often use motion blur to impart a natural look and a sense of motion to film. Motion blur can also visually indicate the relative speeds of objects. Unfortunately, certain capture modes may not work correctly with motion blur, and vice versa. For example, capture settings for slow-motion and/or stabilized video often conflict with capture settings for motion blur. Specifically, slow-motion effects and electronic image stabilization (EIS) are typically created with high frame rate video with a relatively fast shutter speed, while motion blur naturally occurs in image/video capture with a relatively slow shutter speed.

Post-processing techniques can artificially add capture effects with digital image manipulation. For example, a filmmaker may capture video at a high frame rate (e.g., 240 frames per second (fps)) and then convert the video to slow motion video at a normal frame rate (e.g., 30 fps). In another example, a filmmaker may capture video at a high frame rate and then stabilize the video in post-processing. In both these examples, a high frame rate is physically needed for the capture, but the relatively short exposure time will reduce the natural motion blur. During post-processing, motion blur can be artificially added to give the perception of motion for the intended playback speed/stabilized field-of-view.

More generally, existing post-processing techniques allow a filmmaker to physically capture video at a first frame rate, but digitally add effects (e.g., slow motion, image stabilization, etc.) consistent with a different capture frame rate.

BRIEF DESCRIPTION OF THE DRAWINGS

FIG. 2 is a graphical representation of a frame interpolation and stacking technique for adding post-processing motion blur.

DETAILED DESCRIPTION

In the following detailed description, reference is made to the accompanying drawings. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion regarding "one embodiment", "an embodiment", "an exemplary embodiment", and the like indicate that the embodiment described may include a particular feature, structure, or characteristic, and that such feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. The described operations may be performed in a different order than the described embodiments. Various additional operations may be performed and/or described operations may be omitted in additional embodiments.

Vector Blur and Frame Interpolation Techniques

Conventional vector blur techniques blur or smear pixel values in a straight line, according to a motion vector. First, vector blur techniques determine pixel/object movement between frames using optical flow analysis. The optical flow analysis determines motion vectors by dividing the frame into small blocks of pixels (e.g., 1×1 pixel, 2×2 pixels, 4×4 pixels, etc.) and searching for the block within a set distance in the second frame—the block movement is represented as a motion vector. Each motion vector indicates how a block of pixels from a first frame moves to a new position in a second frame. Different optical flow techniques may optimize flow differently e.g., minimizing the sum of squared differences, minimizing a sum of absolute differences, maximizing normalized cross-correlation, phase correlation, differential methods, and/or other distance metrics.

Figure 1:
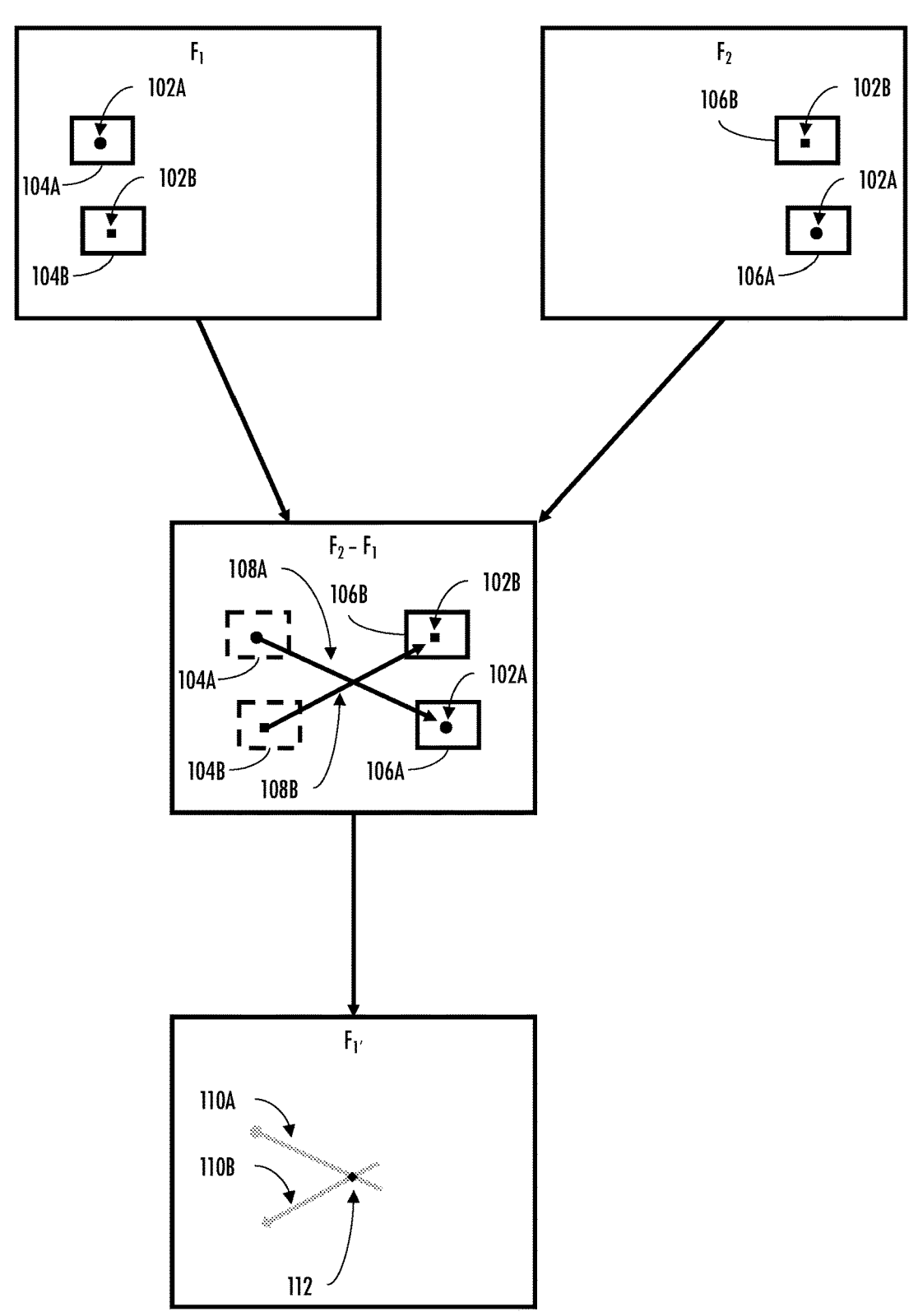
FIG. 1 is a graphical representation of a vector blur technique for adding post-processing motion blur.

Consider the exemplary vector blur technique depicted within FIG. 1. As shown, a first pixel 102A and a second pixel 102B are tracked from a first initial position 104A and a second initial position 104B in frame $F_1$ to a first new position 106A and first new position 106B in frame $F_2$. A first motion vector 108A and a second motion vector 108B describe a magnitude and a direction of movement in polar, cartesian, or higher-order nomenclatures. For example, motion vectors for a 2-dimensional image may use a radius (r) and angle (θ), or a X and Y coordinate values; by extension, motion vectors for a 3-dimensional image may be represented as a radius and two angles (r, θ, φ), or X, Y, Z coordinate values. Still other representations may be substituted with equal success by artisans of ordinary skill in the related arts, given the contents of the present disclosure. Notably, a faster moving object will move a greater distance between frames (frame $F_1$ to frame $F_2$) than a slower (or stationary) object and would thus have a larger magnitude value in the motion vector (or larger X, Y coordinate displacements).

Each pixel color value is mathematically "blurred" by re-distributing its color value based on its corresponding motion vector. The length of the blur may be configured to partially, or completely, extend from the initial position to the new position; the length of the blur may be useful to e.g., different shutter angles, etc. As depicted in FIG. 1, the first blur 110A partially extends from the first new position 104A to the first new position 106A, and the second blur 110B partially extends from the second new position 104B to the second new position 106B.

Pixel color values may be re-distributed according to the distance traveled so that static pixels (e.g., null or 0 magnitude value motion vectors) remain unchanged while pixels with long motion vectors (large magnitude) are convolved/smeared in accordance with the motion vector/path. In one such implementation, pixel color values are summed and weighted across their motion vector/path starting from the current pixel location, and ending with the next pixel location. Accumulating the weighted color values of all motion vectors that cross a pixel location creates a smeared version of the pixel information. An accumulator associated with each pixel location may count the total number of increments/motion vectors that pass through the pixel or a total of all weights of the color values; this information may be used to scale the resulting pixel values. For example, the intersection 112 of the first blur 110A and the second blur 110B sums their respective re-distributed pixel values.

While the foregoing example illustrates an average weight (i.e., the same weighting is given to all pixels along the motion vector), other weighting schemes can be used to change the nature of the motion blur. In one implementation, the sum/weighing allocates the highest weight to the current pixel location and the lowest weight to the next pixel location (the most distant on the motion vector). Alternatively, pixels may be given the highest weight to the next pixel location and the lowest weight to the current pixel location. Various other weighting schemes may be substituted with equal success.

Vector blur techniques render quickly because only one input frame is used to create the effect (e.g., $F_1$ can be blurred to generate $F_{1'}$). In scenes with small amounts of motion, the vector blur technique may look flawless. However, vector blurring treats all pixels identically, and sums pixel values regardless of whether the blur is from an object in the foreground or the background, etc. In other words, objects in the background that would not naturally have much blur may be unnaturally blurred whenever a faster moving object in the foreground moves in front or vice versa.

Frame interpolation (also known as motion interpolation) is a video processing technique in which intermediate frames are generated between captured frames. Frame interpolation has many different applications, including e.g., changing frame rate, changing display rate ("slow-motion"), etc. Within the context of the present disclosure, frame interpolation can be combined with frame stacking to create high quality motion blurs with complex object motion.

Figure 2:
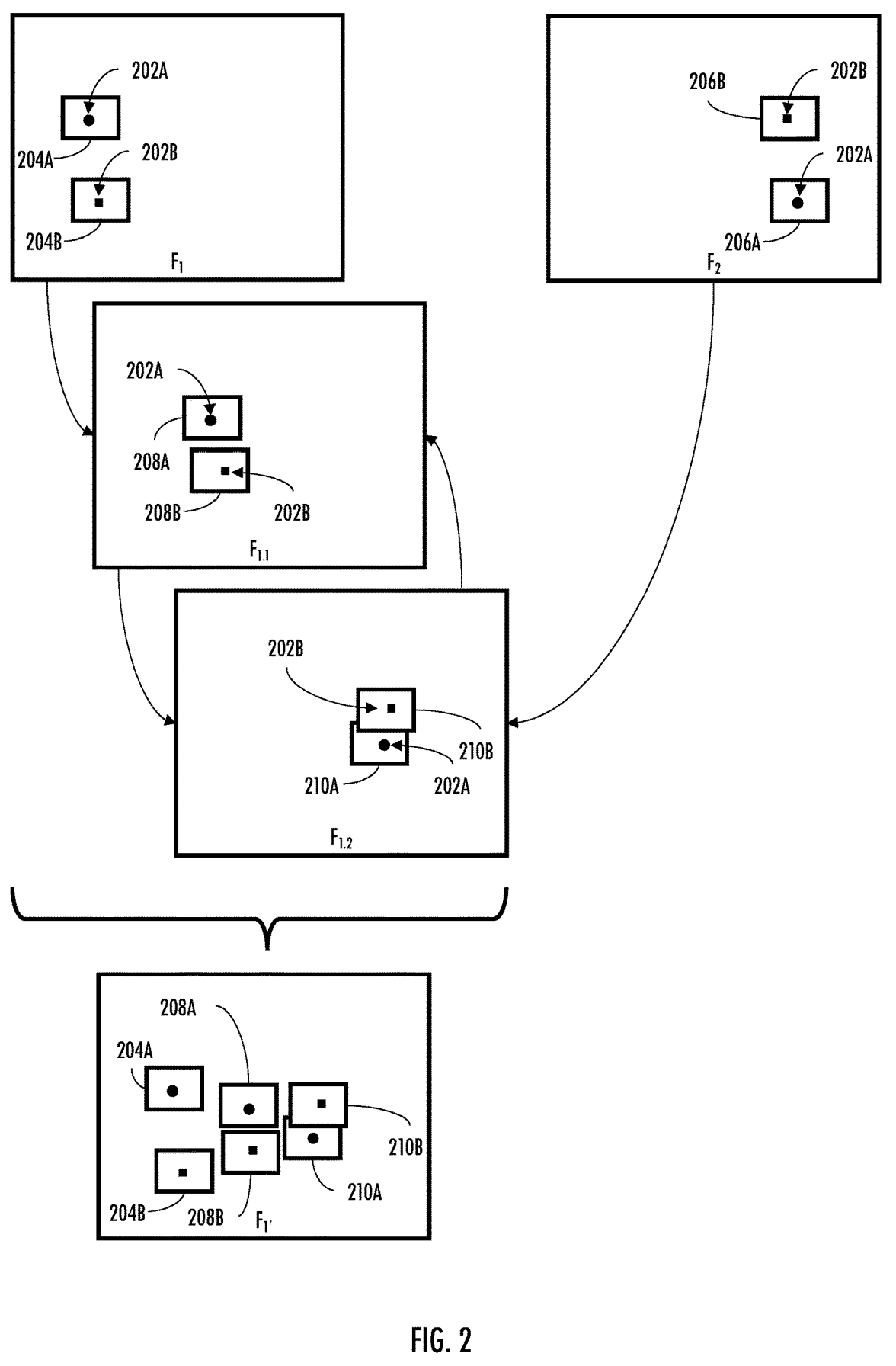

FIG. 2 is a graphical representation of a frame interpolation and stacking technique for adding post-processing motion blur. As shown, a first captured frame $F_1$ includes a first pixel 202A at a first initial position 204A; the first pixel 202A then moves to a first new position 206A in the second captured frame $F_2$. Similarly, a second pixel 202B at a second initial position 204B moves to a first new position 206B in the second captured frame $F_2$. As shown, intermediate frames are created using interpolated motion. For example, interpolated frame $F_{1.1}$ "moves" pixel 202A and 202B to a first interpolated position 208A and 208B; similarly, interpolated frame $F_{1.2}$ "moves" pixel 202A and 202B to a second interpolated position 210A and 210B.

In some embodiments, intermediate frames (e.g., frames $F_{1.1}$ and $F_{1.2}$) may be unidirectionally generated (e.g., only forward or backward) using, for example, pixel information from the captured frames (e.g., $F_1$ and $F_2$) and optical flow/motion vector information. In other embodiments, intermediate frames (e.g., frames $F_{1.1}$ and $F_{1.2}$) may be bi-directionally generated (forward and backward) using e.g., pixel information and optical flow/motion vector information. While the foregoing discussion is presented in the context of frame interpolation based on captured frames, other motion estimation techniques may generate intermediate/interpolated frames from motion information in previously generated intermediate/interpolated frames.

There are a variety of different techniques for generating the intermediate or "synthetic" frames. As one illustrative example, linear frame interpolation uses the temporal relationship between captured frames to interpolate pixel location. For example, the pixel location for an interpolated frame that is ⅓ between frame $F_1$ and $F_2$ may be at a distance that is ⅓ and ⅔ distance from the pixel locations in $F_1$ and $F_2$, respectively. While many pixels are present in both frames, some pixels are only in one frame (e.g., $F_1$ only, $F_2$ only). These pixels correspond to objects that are revealed/occluded between frames (e.g., as an object in the foreground moves in front of an object in the background). As shown in FIG. 2, the second pixel 202B is a part of the foreground and the first pixel 202A is a part of the background; in this case, the interpolated frame $F_{1.2}$ would allow the second pixel 202B (and any related pixels) to occlude the first pixel 202A. In fact, some frame interpolation techniques can incorporate a depth map that contains information relating to the distance of the surfaces of scene objects from the camera ("depth" refers to the third (or fourth) dimension, commonly denoted as the Z-direction). This information can be used to improve interpolated pixels as they are revealed/occluded. More directly, unlike vector blur which blurs these pixels together, frame interpolation can partially reveal/occlude pixels in the intermediate frames. As a result, frame interpolation preserves differences in pixel motion between objects in the foreground, background, etc.

Once the intermediate frames have been generated, a "stacked" frame $F_{1'}$ is created by e.g., summing the pixel values across the various captured and intermediate frames. Conceptually, frame stacking is analogous to layering multiple opaque and/or semi-transparent images on top of each other. Depending on the frame stacking implementation, overlapping pixel values between frames may be used as-is (e.g., only foreground), summed/averaged (blend of foreground/background), or ignored completely (e.g., only background). As a practical matter, there are two general categories of frame stacking: summation implementations that sum the pixel color values across frames, and averaging implementations that average the pixel color values of multiple frames together. In summation implementations, frames are weighted according to a predetermined level of transparency based on, e.g., the number of frames being combined and frame-specific weighting (if any). Once each of the frames has been weighted, then their pixel values can be summed together. In averaging implementations, the pixel values from all the frames are averaged together.

While the foregoing discussion is presented in the context of linear frame interpolation and stacking, a variety of related techniques may be used with equal success. For example, non-linear frame interpolation techniques may perform motion estimation and/or model object motion using higher-order motion estimation (e.g., acceleration, etc.). The processing power and memory required for non-linear frame interpolation typically scales as a function of its underlying algorithm, e.g., motion estimation based on a polynomial would scale according to its polynomial order, etc. Currently, non-linear frame interpolation is infeasible for most embedded applications, however improvements to computing technologies may enable such techniques in the future. Other frame interpolation techniques may rely on neural network processing/artificial intelligence (AI) models for computer vision applications. Such techniques attempt to infer intermediate frames based on previous libraries of training data, etc. Still other approaches use more esoteric algorithms; for example, a single convolution process may combine motion estimation and re-sampling (e.g., changing the frame rate by a factor) in a single step. One such interpolation solution is described in Huang et al., Real-Time Intermediate Flow Estimation for Video Frame Interpolation, arXiv:2011.06294V12, submitted Jul. 13, 2022, incorporated by reference in its entirety.

Figure 3:
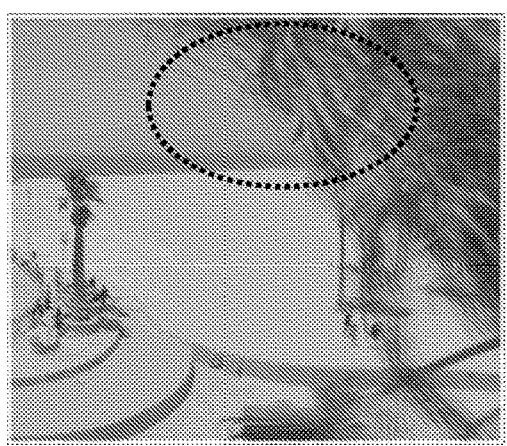
FIG. 3 is a comparison of motion blur effects introduced with vector blur and multiple levels of frame interpolation (with stacking) on the same video data.
Figure 3:
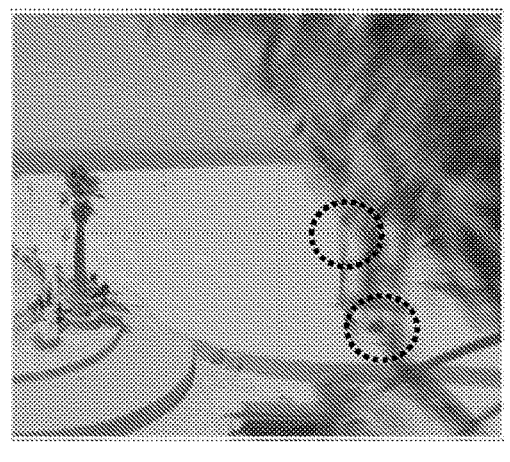
Figure 3:
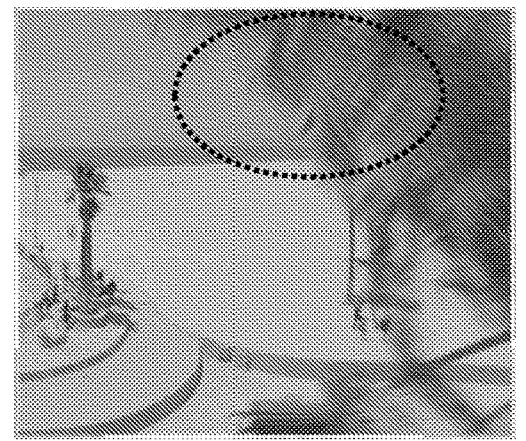
Figure 3:
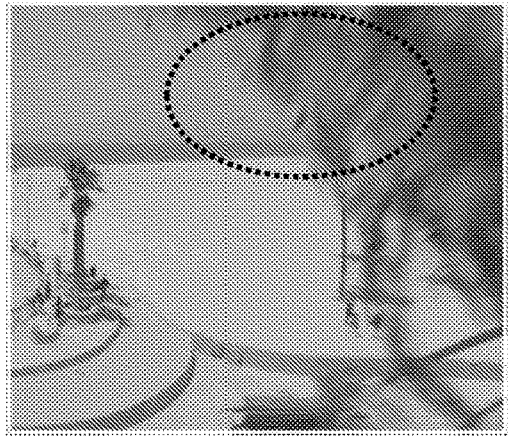

Trade-offs exist between the two aforementioned techniques. FIG. 3 provides a side-by-side comparison of one exemplary frame 302 using the vector blur technique and multiple frames 304, 306, and 308 that exhibit different levels of frame interpolation with stacking on the same video data. As one anecdotal comparison, frames 302, 304, 306, and 308 were generated with the same test system (i.e., the rendering time differences are attributed to computational complexity). Frame 302 was rendered with the vector blur technique in 0.08 seconds. Frame 304 was rendered with 2× frame interpolation (one intermediate frame for every captured frame) in 0.12 seconds. Frame 306 was rendered with 4× frame interpolation (three intermediate frames for every captured frame) in 0.28 seconds. Frame 308 was rendered with 8× frame interpolation (seven intermediate frames for every captured frame) in 0.66 seconds. As previously noted, the vector blur technique renders much faster than frames rendered using frame interpolation and stacking because the vector blur technique uses only one capture frame during rendering. The frame interpolation complexity (e.g., processing time and memory space) scales based on the number of generated intermediate frames, etc.

Notably, the vector blur and frame interpolation techniques introduce different types of visual artifacts. Frame interpolation can introduce "ghost artifacts" ("ghosting") when an insufficient number of intermediate frames are used for frame interpolation/frame stacking. For example, the tree circled in the foreground of frame 304 (generated using the 2× frame interpolation) illustrates substantial ghosting artifacts; ghosting artifacts are present but greatly reduced in frames 306 and 308, due to the larger number of intermediate frames.

While vector blur techniques avoid ghosting artifacts, vector blur can add motion blur to objects that should not be blurred (or vice versa). Typically, these blur artifacts are added to stationary/slow-moving objects that are next to a fast-moving object. In one such example, a stationary/slow-moving object may be assigned the same motion vectors (and resulting blur) as the fast-moving object due to the imprecise boundaries of optical flow. For instance, the circled portions of frame 302 show a post that has been "split" and people that are "blurred"; these artifacts are not present in the frame interpolation frames 304, 306, 308. More generally, vector blur artifacts incorrectly attribute motion vectors to objects; thus, objects that should not have much (if any) motion blur, are excessively blurred/split, etc.

Exemplary Multi-Layer Motion Blur

Figure 4:
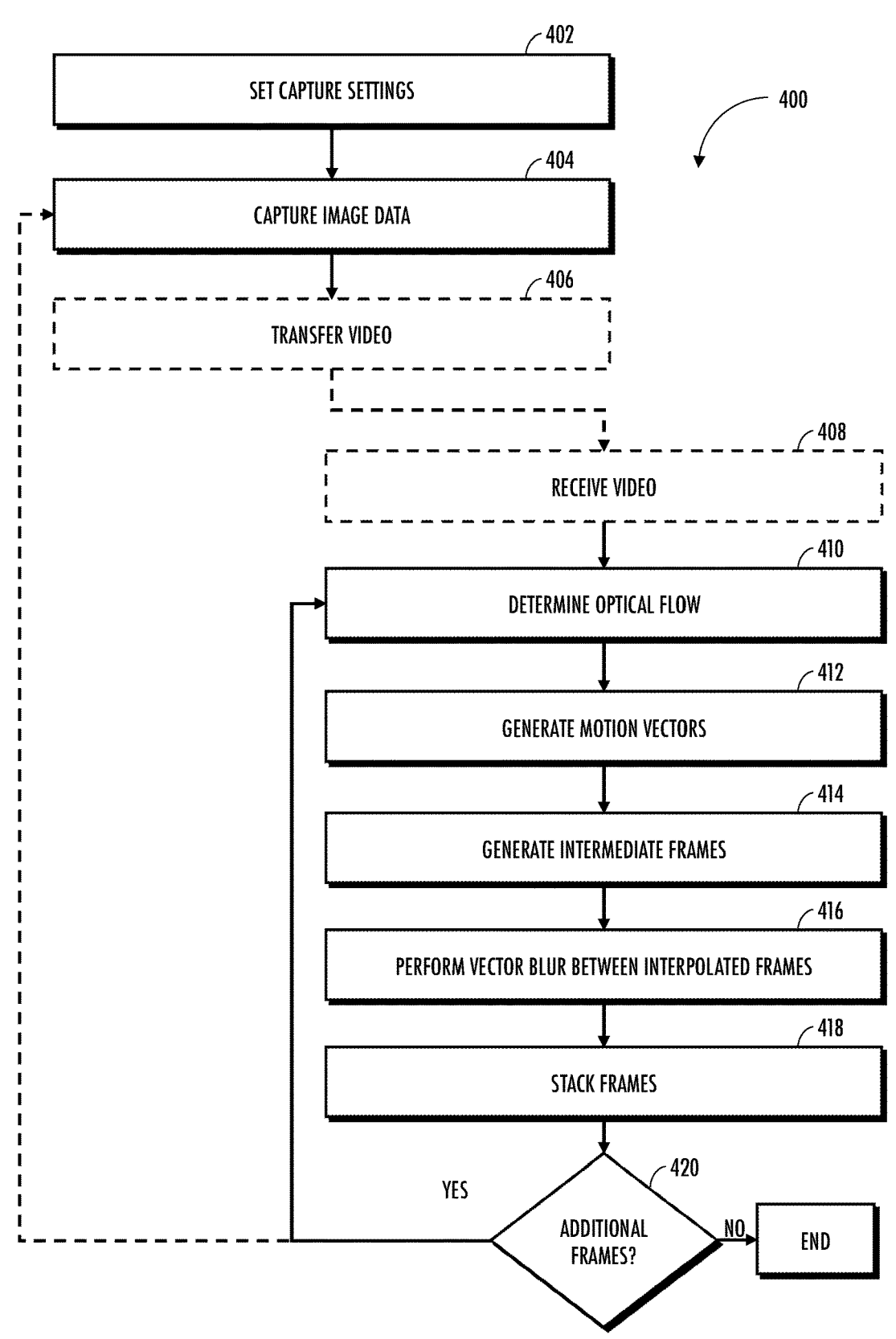
FIG. 4 illustrates an exemplary logical flow diagram of a combined vector blur and frame interpolation with stacking technique for adding motion blur according to aspects of the present disclosure.

Various embodiments of the present disclosure describe using a combination of vector blur and frame interpolation with stacking in post-processing for more realistic outcomes with faster/more efficient rendering. FIG. 4 illustrates an exemplary logical flow diagram of a combined vector blur and frame interpolation with stacking technique for adding motion blur according to aspects of the present disclosure. Certain steps (e.g., steps 402-406) of method 400 may be performed by a camera device. Other steps (e.g., steps 408-418) may be performed by processing systems on in the camera or by a separate post-processing device. FIGS.

5A-5B are graphical representations of adding post-processing motion blur using a combination of vector blur and frame interpolation with stacking according to aspects of the present disclosure.

In one exemplary embodiment, the camera may be set to capture frames at a different frame rate than intended for playback (step 402 of the method 400). Differences in capture and playback frame rates allow certain effects to be added in post-processing. For example, some cameras have a slow-motion capture mode that captures frames at a relatively high capture frame rate but encodes the video for playback at a slower playback frame rate. As another example, some cameras use a high capture frame rate to improve image stabilization (a faster capture rate reduces the amount of movement between frames.)

As an important tangent, "convincing" slow motion often requires the addition of motion blur in post-processing. During capture, the camera sets its aperture, ISO (sensor gain) and shutter speed (exposure time) to achieve the correct exposure. Unfortunately, slowing the captured media down to a desired playback rate does not change the exposure of the capture. In other words, a video captured at 240 fps played back at 30 fps is a "8× slow motion" video; however, the video may look jittery and unnatural because the motion will be too crisp. Similar effects can occur for footage that is captured at a high capture rate for image stabilization, but where cinematic motion blur for playback is desired. More directly, the natural motion blur which a human would expect to see at the intended playback speed (e.g., 30 fps) may be reduced, or even imperceptible, because the physical capture occurs at a higher speed (e.g., 240 fps). Adding motion blur in post-processing can fix this perceptual mismatch.

At step 404, a scene may be captured using the physical capture settings. The captured image data is then processed by a processing pipeline of the camera (e.g., the image signal processor (ISP), the processing system, and the codec) before being stored as video on removable storage media. In some embodiments, the camera may perform "in-camera" processing. Typical examples of in-camera processing may include e.g., stabilization, rate adjustment (e.g., slow motion), color correction, tone mapping, and/or augmented dynamic range (HDR, etc.). Furthermore, some motion information may be determined in-camera (e.g., as part of video encoding) and saved for reuse during post-processing (either in the encoded video or as separate metadata). In some cases, in-camera motion information may be stored for later use during post-processing in place of, or in addition to, optical flow and motion vector generation. In other embodiments, raw sensor data from the camera sensor may be directly saved to the removable storage media.

In some cases, the captured video from the camera may be transferred to a post-processing device to add motion blur (step 406 and step 408). For example, a user may capture footage via their action camera, and then immediately transfer to their smart phone to perform fast, low-quality edits "in-the-field"; in other situations, the user may transfer footage to their laptop or workstation to perform more compute-intensive high-quality edits. In some cases, a hybrid approach may be used, e.g., smart phone edits may be further improved by the laptop, etc. Typically, video may be transferred via a removable storage media such as a memory card or a data/network interface (wired or wireless).

Figure 5A:
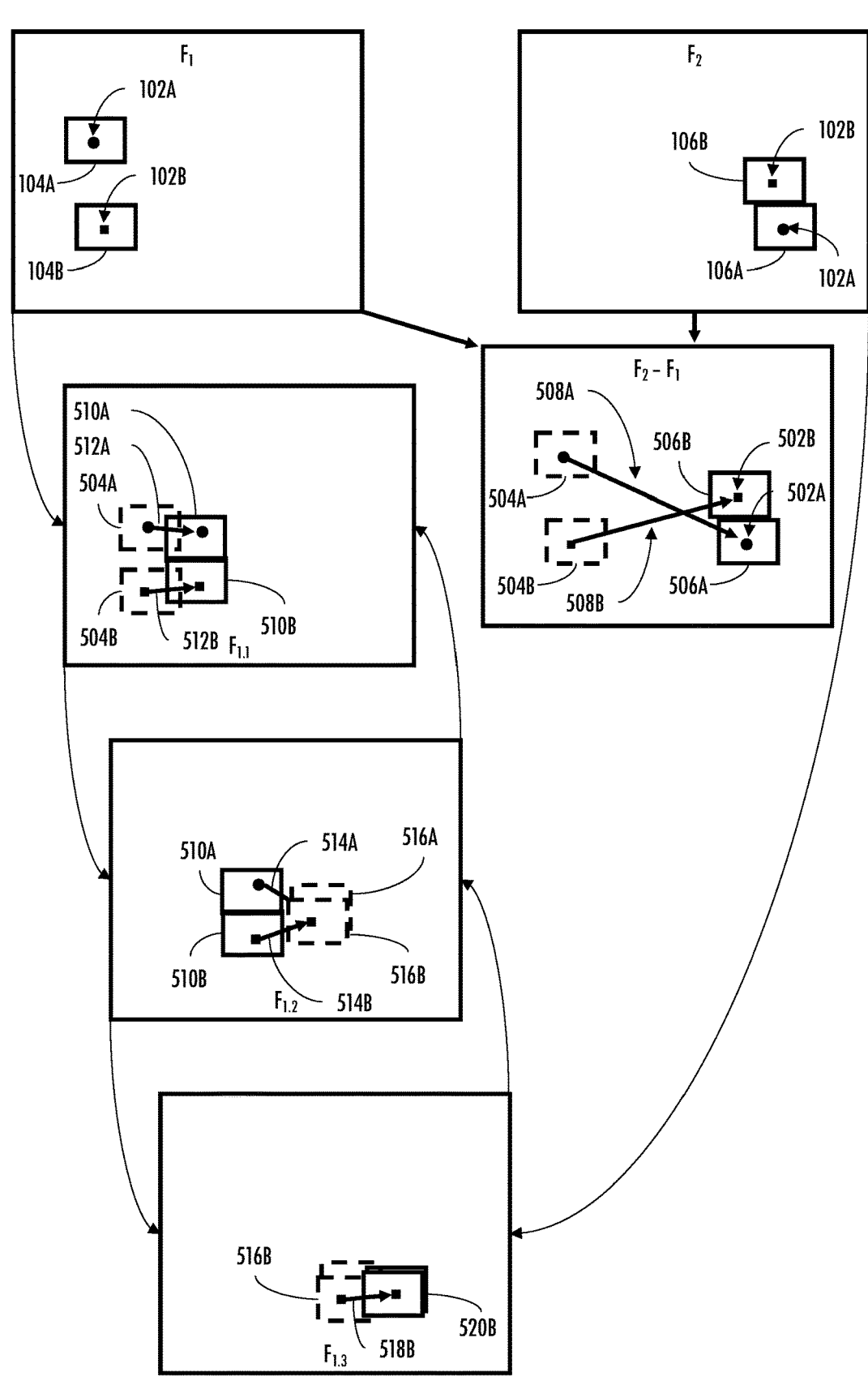
FIGS. 5A-5B are graphical representations of one exemplary technique for adding post-processing motion blur according to aspects of the present disclosure.

At step 410 and step 412, the post-processing device determines optical flow and generates motion vectors from the received video. In one exemplary embodiment, optical flow analysis tracks the movement of pixels, blocks, or identified objects across a series of frames in the video. Optical flow analysis may be performed in the forward direction, or bi-directionally. The result of the optical flow analysis is a set of motion vectors for each pixel, block of pixels, or identified object. For example, a first pixel 502A of FIG. 5A is tracked from a first initial position 504A in frame $F_1$ to a new first position 506A in frame $F_2$; this movement is represented as a first "base" motion vector 508A. Similarly, a second pixel 502B is tracked from a second initial position 504B to a new second position 506B in frame $F_2$; this movement is represented as a second "base" motion vector 508B.

In one exemplary embodiment, additional "intermediate" motion vectors are generated based on the number of intermediate frames to be generated. Thus, if 3 intermediate frames are to be generated (a 4× frame interpolation), then the base motion vectors are split into 4 intermediate motion vectors. For example, as shown in FIG. 5A, the first base motion vector 508A may be sub-divided into: a first intermediate motion vector 512A, a second intermediate motion vector 514A, a third intermediate motion vector (occluded by foreground), and a fourth intermediate motion vector (not shown). Similarly, the second base motion vector 508B may be sub-divided into: a fifth intermediate motion vector 512B, a sixth intermediate motion vector 514B, a seventh intermediate motion vector 518B, and an eighth intermediate motion vector (not shown). In this example, the fourth and eighth intermediate motion vectors would not be used to generate an intermediate frame but may be retained for vector blurring discussed below. In one exemplary embodiment, the sub-division corresponds to a linear interpolation; other interpolative methods may be substituted with equal success (e.g., polynomial, non-linear, machine learning, etc.).

At step 414, the post-processing device performs frame interpolation to generate intermediate frames between the captured frames in a video. The intermediate frames may be generated by moving the pixel, blocks of pixels, or identified objects according to the corresponding intermediate motion vectors. For example, three interpolated frames $F_{1.1}$, $F_{1.1}$ and $F_{1.3}$ are generated from captured frames $F_1$ and $F_2$. Interpolated frame $F_{1.1}$ "moves" the first pixel 502A according to the first intermediate motion vector 512A to position 510A; interpolated frame $F_{1.2}$ "moves" the first pixel 502A according to intermediate motion vector 514A to position 516A; interpolated frame $F_{1.3}$ "moves" first pixel 502A according to an intermediate motion vector (occluded by foreground) to a position (occluded by foreground). Similarly, the second pixel 502B is moved to positions 510B, 516B, 520B via intermediate motion vectors 512B, 514B, 518B, respectively. Successive intermediate frame generation may continue until (or just prior to) the next captured frame $F_2$.

As previously noted, frame interpolation may include partially occluding and revealing pixels, blocks of pixels, or identified objects. In this case, the first pixel 502A is occluded by the second pixel 502B. Preserving foreground/background information avoids unintentional blurring artifacts that could be introduced by vector blurring. Different frame interpolation schemes may handle occlusions differently. For pixels and/or indivisible units of the image, the occlusion/reveal may be based on an approximation. Thus, a pixel may be completely occluded in $F_{1.1}$ (rather than $\frac{1}{4}^{th}$ occluded), and completely revealed in $F_{1.2}$ (rather than $\frac{1}{2}$ occluded). Alternatively, these portions may be weighted and summed (e.g., treated as semi-transparent). For example, a pixel block that is fully occluded in $F_2$ may be $\frac{1}{4}^{rd}$ occluded in $F_{1.1}$ and $\frac{1}{2}$ occluded in $F_{1.2}$, etc.

At step 416, the post-processing device may perform vector blur on the captured frames as well as the intermediate frames. In one exemplary embodiment, the vector blur operation selectively uses the intermediate motion vectors (rather than the base motion vectors) to achieve different shutter angles.

As a brief aside, post-processing can be used to add cinematic-style motion blur to achieve a desired virtual-shutter angle. Shutter angle describes the amount of motion blur between frames. A 360° shutter angle completely blurs motion from one captured frame to the next captured frame. A 180° shutter angle blurs motion for half of the frame interval. A 180° shutter angle is commonly associated with cinematic footage. Stabilization and high-speed frame stacking for different shutter angle effects are more broadly described within co-owned U.S. patent application Ser. No. 17/647,581 entitled "SYSTEMS, APPARATUS, AND METHODS FOR STABILIZATION AND BLENDING OF EXPOSURES" filed Jan. 10, 2022, incorporated herein by reference in its entirety. Those techniques may be used in combination with frame-stacking and vector blur e.g., where additional motion blur is desired.

Figure 5B:
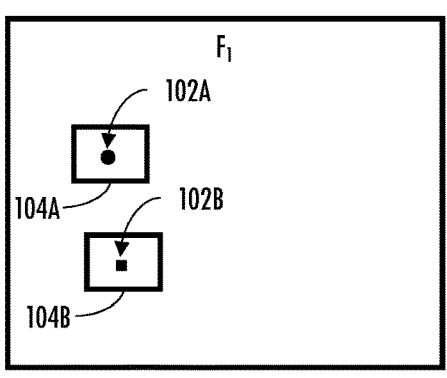
Figure 5B:
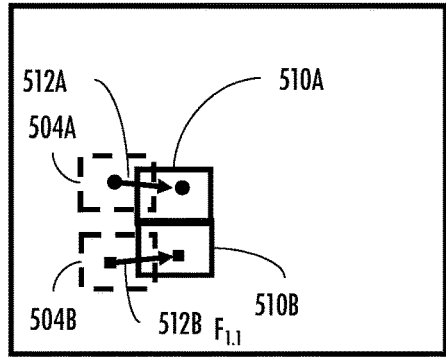
Figure 5B:
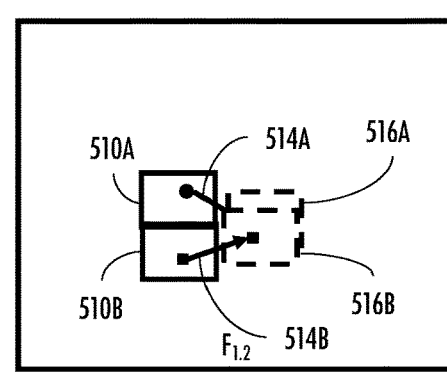
Figure 5B:
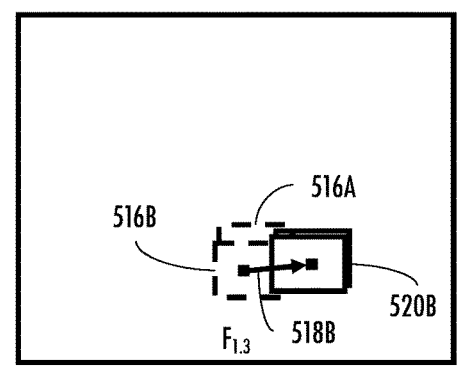
Figure 5B:
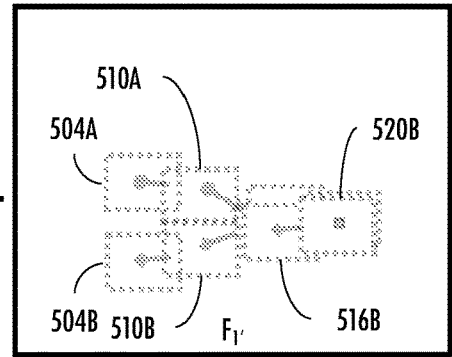

As shown in FIG. 5B, motion blur may be added to each of the intermediate frames. To simulate a 180° shutter angle, the pixels are blurred for half of the frame interval (e.g., the first pixel 502A is blurred for half of intermediate motion vector 512A, intermediate motion vector 514A, a third intermediate motion vector, etc.; the second pixel 502B is blurred for half of intermediate motion vector 512B, intermediate motion vector 514B, intermediate motion vector 518B, etc.). In other implementations, motion blur may be added from the first input frame to the first intermediate frame ($F_1$ to $F_{1.1}$), and from the third intermediate frame to the fourth intermediate frame ($F_{1.2}$ to $F_{1.3}$). The other transitions may be left unblurred (e.g., from $F_{1.1}$ to $F_{1.2}$ and from $F_{1.3}$ to $F_2$). This would also provide a blur that is half of the frame interval. Still other suitable implementations might blur between two contiguous frames, and leave two contiguous frames unblurred (e.g., $F_1$, $F_{1.1}$, $F_{1.2}$ are blurred, $F_{1.2}$, $F_{1.3}$, $F_2$ are not blurred, etc.) Various other blurring patterns may be substituted with equal success.

In one exemplary embodiment, the vector blurs are calculated by re-distributing the base pixel value according to the corresponding intermediate motion vector. For example, the first pixel value for the first pixel 502A is used to blur from position 504A to position 510A according to intermediate motion vector 512A, and again from position 516A to another position according to an intermediate motion vector. Similarly, the second pixel value for the second pixel 502B is used to blur from position 504B to position 510B according to intermediate motion vector 512B, and again from position 516B to position 520B according to intermediate motion vector 518B. The results of each operation may be summed and scaled/weighted, giving the highest weight to the starting pixel values and the lowest weight to the pixel which is the most distant on the intermediate motion vector. Alternatively, pixels may be given the highest weight to the most distant on the intermediate motion vector and the lower weight to the starting pixel. In a further alternative, each pixel is given an average weight (i.e., no weighting is given to any pixel along the intermediate motion vector).

At step 418, the post-processing device may stack the frames to generate a new frame $F_{1'}$ with added motion blur. Generated intermediate frames (frames $F_{1.1}$, $F_{1.2}$, and $F_{1.3}$) may be stacked (along with data frame captured frames) to generate motion blur for a frame. As shown in post-processed frame $F_{1'}$, the first pixel 502A moves to positions

504A and 510A (remaining positions are occluded) in the stacked frame $F_{1'}$. The second pixel 502B moves to positions 504B, 510B 516B and 520B in the stacked frame $F_{1'}$.

In one example, combined frames (e.g., frame $F_{1'}$) may be linearly averaged with each frame receiving the same weight which is visually equivalent to combining the frames at an equal transparency. In other examples, the stacked frame may weigh certain frames more heavily (e.g., weighing captured frames more heavily than intermediate frames).

The post-processing device may repeat the process for the next frames (step 420, yes branch), or end when there are no further frames to process (step 420, no branch). For implementations that add motion-blur during an on-going capture (e.g., in-camera processing), the flow returns to step 404 and determines optical flow on the next set of frames. Alternatively, implementations that add motion-blur in post-processing may return to step 410 to determine the next optical flow, or step 412 to generate the next set of motion vectors.

Figure 6:
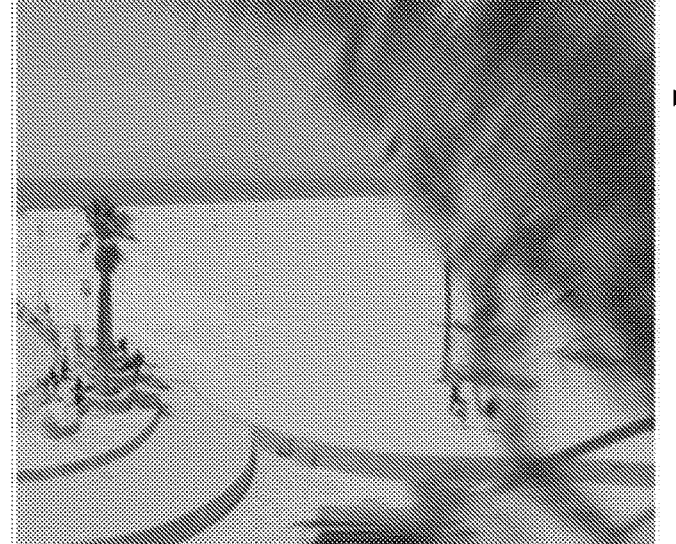
FIG. 6 illustrates exemplary frames generated with the exemplary technique for adding post-processing motion blur according to aspects of the present disclosure.
Figure 6:
Figure 6:
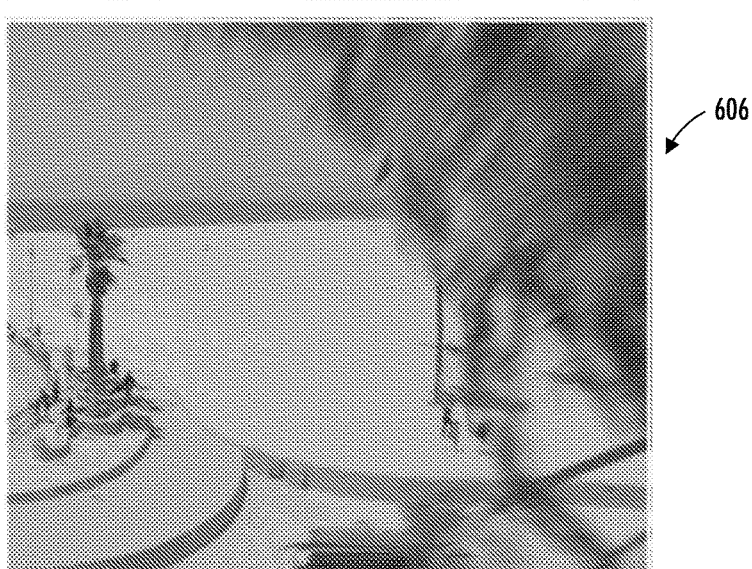

FIG. 6 illustrates exemplary frames 602, 604, and 606 using a combined vector blur and frame interpolation (with stacking) technique according to aspects of the present disclosure. The frames 602, 604, and 606 use the same video data (and the same video data of the frames of FIG. 3). Frame 602 was rendered with 2× frame interpolation (one intermediate frame for every captured frame) in 0.27 seconds. Frame 604 was rendered with 4× frame interpolation (three intermediate frames for every captured frame) in 0.59 seconds. Frame 606 was rendered with 8× frame interpolation (seven intermediate frames for every captured frame) in 1.29 seconds.

When compared to the same test images in FIG. 3, the ghost artifacts from frame interpolation alone (e.g., frames 304, 306, and 308 of FIG. 3) are substantially smoothed even in the 2× frame interpolation example (frame 602). Similarly, foreground and background artifacts that were introduced by the vector blur technique (e.g., in the post in frame 302 of FIG. 3) are absent when using the combined technique (shown in frames 602, 604, and 606). More broadly, combining vector blur with frame interpolation blurs the sharp edges of ghost artifacts. Similarly, frame stacking during the frame interpolation process may remove or avoid unintentionally blurred foreground and background artifacts that might be introduced by vector blur techniques alone. In other words, these techniques have synergistic benefits when applied together.

Adaptive Rendering Variants

As a brief aside, conventional post-processing techniques arose out of cinema and have often been able to rely on the filmmaker to select and stage their shots, so that processing may be performed on short cuts. For example, a fast "pan" in one direction may have large magnitude motion vectors which are oriented in the same direction. As previously alluded to, these scenes may be more efficiently handled with vector blur than frame interpolation. Conversely, dolly motion, zooms, and tilts impart large differences in direction and perspective that may introduce the foreground/background artifacts with vector blur. Conventional cinematographers might break their shots up into a pan, a zoom, a tilt, etc. Later, in post-processing, these short sections of footage could be post-processed according to the technique that best suits the intended effect. In other words, a panned scene might be vector blurred, whereas a zoomed scene might require frame interpolation with stacking.

Consumer-driven post-processing is a relatively recent phenomenon. Action cameras enable filmmakers to capture footage "as-is"; as a practical matter, most action footage has complex motion that switches between different movements and/or perspectives within the same capture. In other words, conventional tools for post-processing are not designed to add motion blur for the long captures and diverse movements of action photography.

Various aspects of the present disclosure extend the combination of motion blur techniques to enable adaptive rendering. This allows blurring to be performed on a spectrum between the two distinct modalities, dynamically shifting according to the motion of the footage. In other words, the adaptive rendering techniques may selectively adjust blurring for different portions of a single video (temporal portions) or different portions of a single frame (spatial portions). In some implementations, motion information may be used to further triage temporal or spatial portions that would benefit from more (or less) motion blur. Changing the type and amount of motion blur contributed by the blur techniques may be used to further fine tune the aesthetics of the resulting output.

Figure 7:
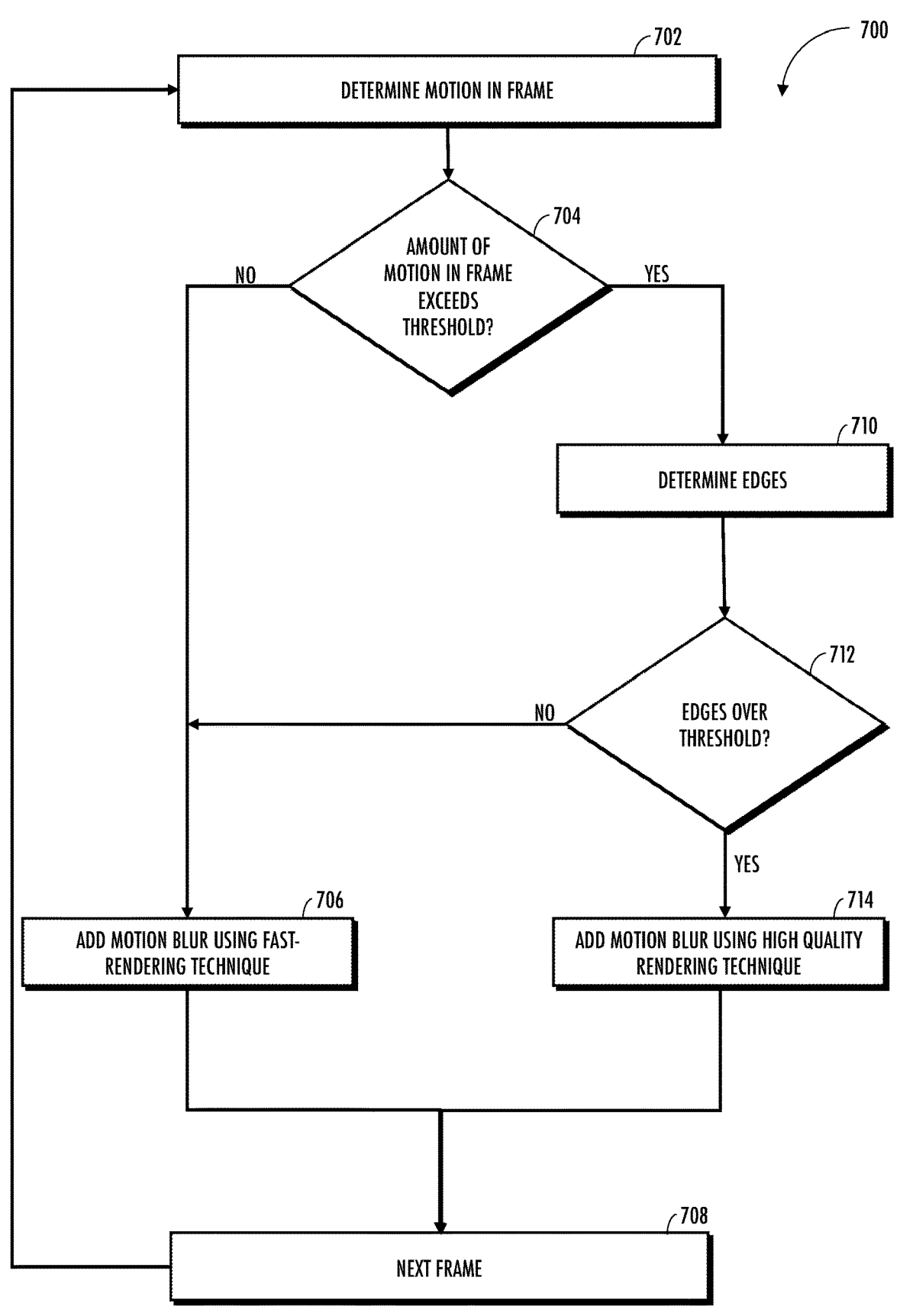
FIG. 7 illustrates an exemplary logical flow diagram of an adaptive rendering technique for adding motion blur according to aspects of the present disclosure.

FIG. 7 illustrates an exemplary logical flow diagram of an adaptive rendering technique for adding motion blur. The steps of method 700 may be performed "in-camera" during capture, or after capture with a post-processing device. While the following discussion is presented in the context of a two-stage rendering with vector blur and frame interpolation (with stacking), a different number of stages and techniques may be substituted with equal success.

At step 702, a device determines an amount of motion between consecutive frames of a video. In post-processing embodiments, the amount of motion may be based on an optical flow analysis of the consecutive frames of the video. For example, the number, magnitude, and/or direction of motion vectors for pixels, blocks of pixels, or other objects may be summed and/or averaged to determine a composite score. In one such implementation, the composite score is representative of the overall movement in the frame. Other variants may generate composite scores to e.g., represent the peak movement of the frame, the directionality of the frame (e.g., contrasting/non-contrasting motion), the history of motion, etc. A peak movement score may represent the maximum amount of motion in a frame. For example, a selected percentile (10%) of the largest magnitude motion vector(s) in a frame may be averaged to generate a peak movement score. A directional score may be based on a sum of the absolute magnitude of the motion vectors, and a sum of the directional motion vectors with direction. Large discrepancies between absolute and directional sums would indicate non-uniform directionality (high contrasting motion); whereas both proportionally sized absolute and directional sums would indicate low contrast movement.

In some implementations, magnitude of motion and its distribution over a range may be tracked with histograms. In one specific implementation, histograms may present a ranking of the individual motion vectors in the frame (or a characteristic subset). Histograms may be useful to time-filter adaptive behavior and avoid sudden changes in blurring techniques.

In-camera embodiments may be able to infer the amount of motion based on sensors and/or capture parameters. For example, an action camera may have a set of accelerometers, gyroscopes, and/or magnetometers that can be used to directly measure motion of the camera. In addition, the camera exposure settings may be used to determine lighting conditions, frame rate, etc. These factors can be used in combination to determine whether motion would likely experience ghost artifacts during frame interpolation. Additionally, onboard processing (e.g., facial recognition, object recognition, motion compensation, in-camera stabilization, etc.) may be used to identify capture scenarios that may require different blurring effects. For example, a rapidly moving "face" against a background, or vice versa, could be susceptible to e.g., foreground/background artifacts.

In hybrid variants, a post-processing device may use capture and/or in-camera metadata to further improve its optical flow analysis. For example, in-camera stabilization results may be used to infer the camera motion, and by extension, motion in the frames. Exposure settings may be used to determine the shutter speed/angle during capture, etc. This information may be useful in combination with optical flow analysis to infer the amount of motion with greater precision.

At step 704, the device determines whether the amount of motion exceeds a threshold. In one specific implementation, the composite score/histogram may be compared with a threshold value. In another example, a generated histogram may contain two or more classifications of motion (e.g., high/low; low/medium/high, etc.). The thresholds may include a certain number or certain percentage of pixels/motion vectors with a particular classification (e.g., more than 5% of motion vectors being classified as high motion).

As previously alluded to, motion blur may be used to varying degrees to create a desired aesthetic "look and feel". As a practical matter, the threshold value may be set to a default value that the user may adjust up or down, as they see fit. In some cases, the threshold value may also balance other aspects of post-processing operation—for example, devices with processing, memory, or power limitations may have a "floor" to ensure that rendering remains within device capabilities. This may be particularly useful in mobile and embedded devices (e.g., post-processing on a smart phone, etc.) where device resources are limited.

There is a low likelihood that a fast-rendering technique such as vector blur would introduce artifacts in frames with low motion content. Thus, where the amount of motion is determined to be under (or equal to) the threshold (step 704, no branch), a fast-rendering technique may be used by the post-processing device to generate motion blur in the frame (step 706) with e.g., a vector blur technique, etc. Once rendered, the post-processing device can move to the next frame (step 708).

Some frames with high motion content may still be good candidates for applying motion blur using a fast-rendering technique. For example, where there is a relatively little overlapping or contrasting motion in a frame, rendering motion blur with a fast-rendering technique may be adequate to achieve results without perceptible artifacts. As previously noted, one such example is where a video scene is panning at high speed. Each pixel in the frame is moving, however there may be a low amount of contrasting motion since all pixels moving in the same direction. Conversely, dolly motion may create high contrast motion because pixels are moving in different directions, etc.

As shown in FIG. 7, contrasting motion may be determined via edge detection on motion vectors/motion vector magnitudes. Where the amount of motion is determined to be above the threshold (step 704, yes branch), the device may additionally perform edge detection on the motion vector data (step 710). Motion vector data in a frame may be represented as an array or matrix of motion vectors/values. Edge detection may search for an edge within the array or matrix of motion vectors/values. If there is contrasting motion in the frame then the device may use a high-quality but slower render to e.g., address differences in motion between foreground objects and the background (step 712, yes branch). The device may add motion blur using a high-quality rendering technique (step 714). For example, a frame interpolation technique or a combined vector blur and frame interpolation technique (as described above) may be used. Where edges are not detected or are not over a threshold value (step 712, no branch), the device may generate motion blur in the frame using a fast-rendering technique (step 706).

Once rendered, the device can move to the next frame and repeat the process (return to step 702).

Figure 8:
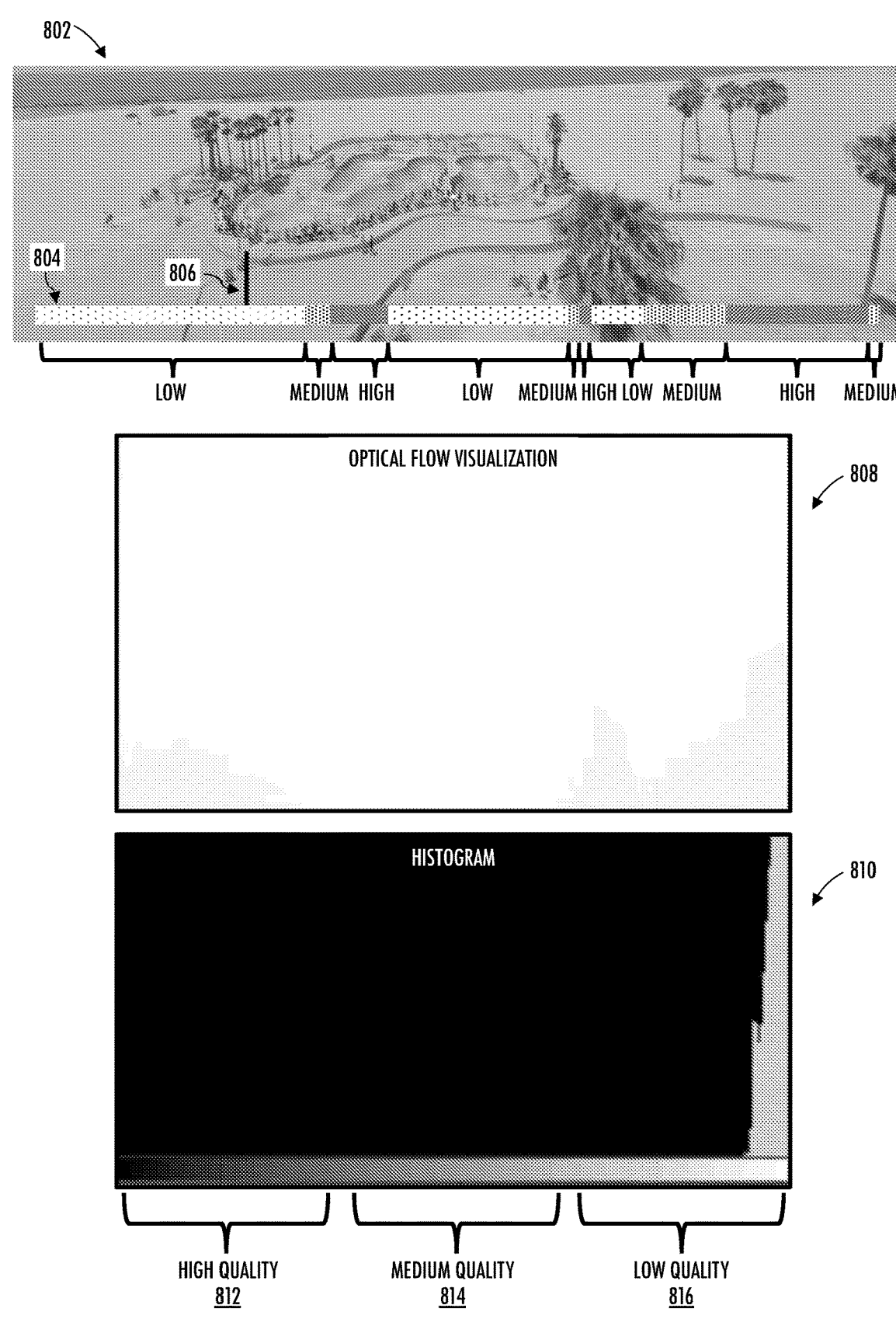
FIG. 8 illustrates a sample frame of an exemplary video according to aspects of the present disclosure.
Figure 9:
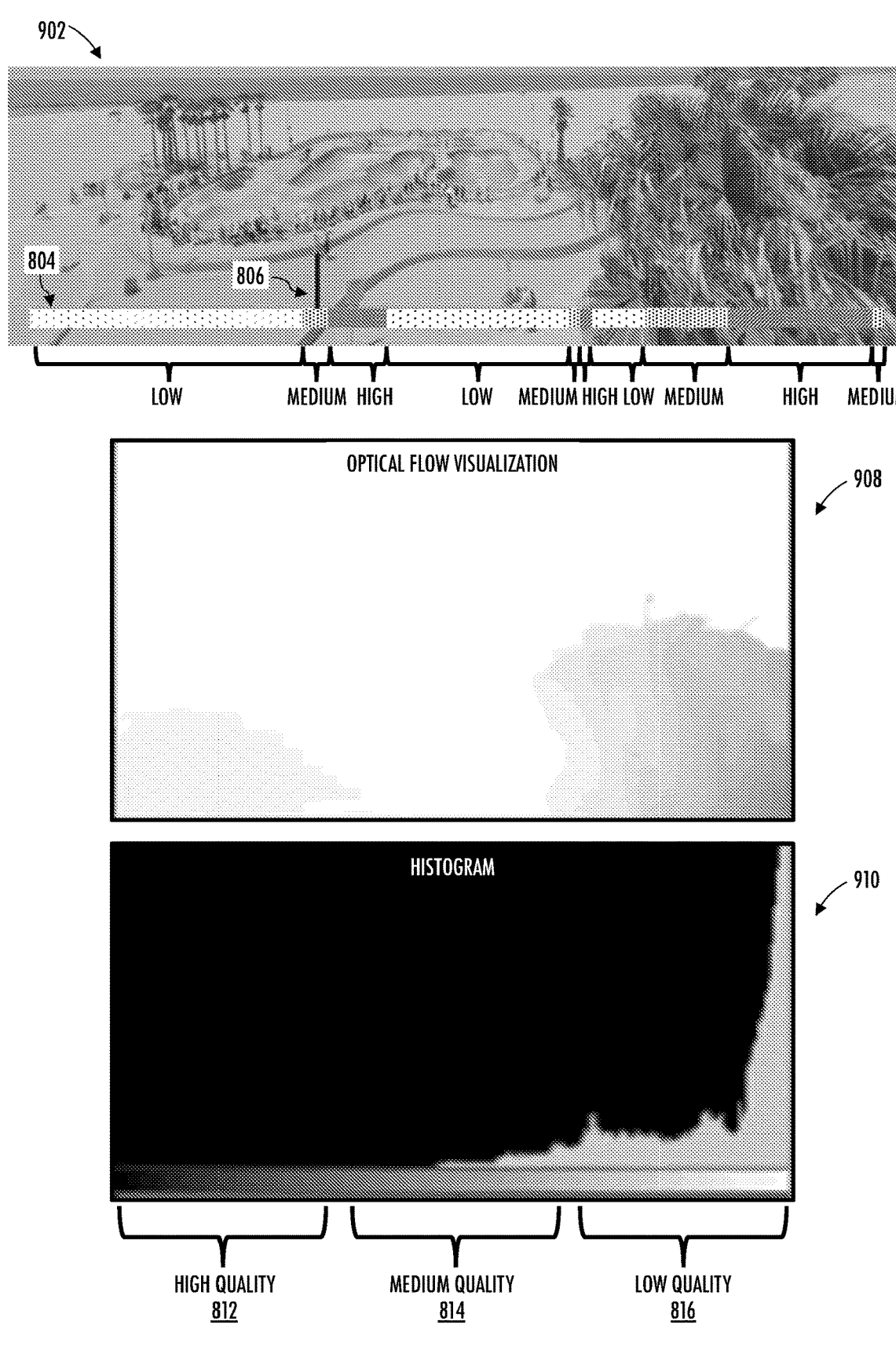
FIG. 9 illustrates a sample frame of an exemplary video according to aspects of the present disclosure.
Figure 10:
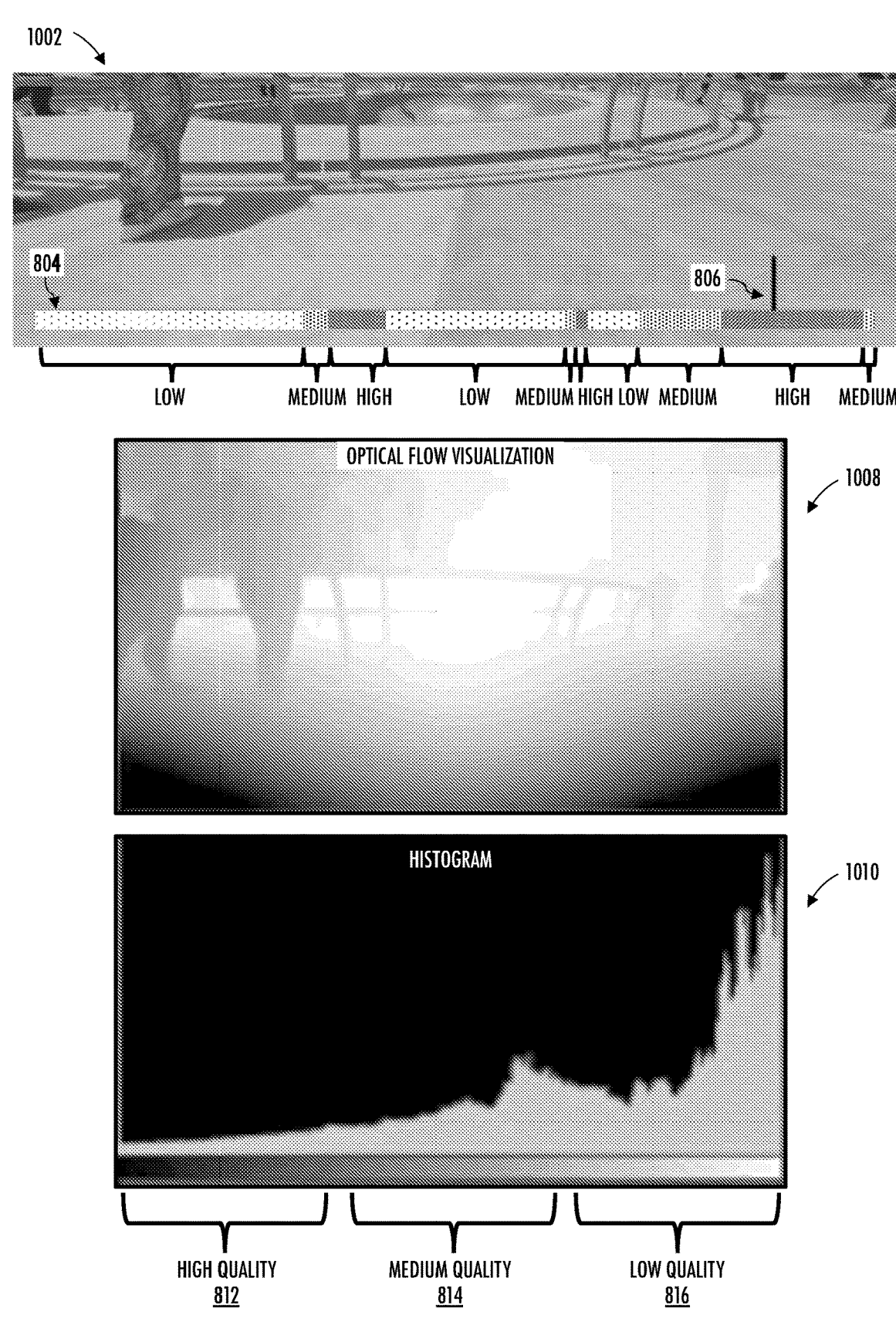
FIG. 10 illustrates a sample frame of an exemplary video according to aspects of the present disclosure.

FIGS. 8, 9, and 10 illustrate sample frames 802, 902, and 1002 of an exemplary video according to aspects of the present disclosure. The exemplary video shows an aerial shot descending on a beachside skatepark. Each of the frames 802, 902, and 1002 show differing amounts of motion in the frame. While shown with three motion categories (high, medium, and low), artisans of ordinary skill will appreciate any number of categories may be used to render motion blur using various techniques.

Frames 802, 902, and 1002 include a progress bar 804 with an indicator 806 marking the place in the video. The progress bar 804 identifies sections of the video that have a high, medium, or low amount of motion. For example, frame 802 is in a low motion content area (see location of indicator 806); thus, frame 802 uses an efficient/fast render (vector blur only). Frame 902 is in a medium motion content area; thus, frame 902 uses a medium quality render (e.g., 2X frame interpolation with vector blur). Frame 1002 is in a high motion content area; thus, frame 1002 uses the highest quality render (e.g., 4× frame interpolation with vector blur). In this example, an exemplary frame took ~0.59 seconds to render using a high-quality rendering technique, ~0.27 seconds using a medium-quality rendering technique, and ~0.08 seconds using a low-quality rendering technique.

The optical flow visualizations 808, 908, and 1008 are a graphical representation of the magnitude of the motion vectors. In the optical flow visualizations 808, 908, and 1008, white/lighter gray pixels represent low/no motion whereas black/darker gray pixels represent high motion. Motion vectors are also illustrated in the histograms 810, 910, and 1010. Like in the optical flow visualizations 808, 908, and 1008, the magnitudes of motion vectors are assigned a shade to indicate their corresponding amount of motion. The histograms 810, 910, and 1010 are separated into three quality categories, a high-quality category 812, a medium-quality category 814, and a low-quality category 816.

While the foregoing process is described in the context of frames, the techniques may be applied in whole or part to the various spatial sections of the frame and/or temporal sections of a video. For example, most images are captured with large swaths of sky, ground, and/or other periphery content. These sections often do not contain interesting visual content and may be more aggressively blurred. Conversely, certain types of objects are very important—e.g., human perception is often keenly attuned to recognize facial features and/or body movements; thus, areas of the frame that include human features may warrant more processing complexity, etc.

Figure 11:
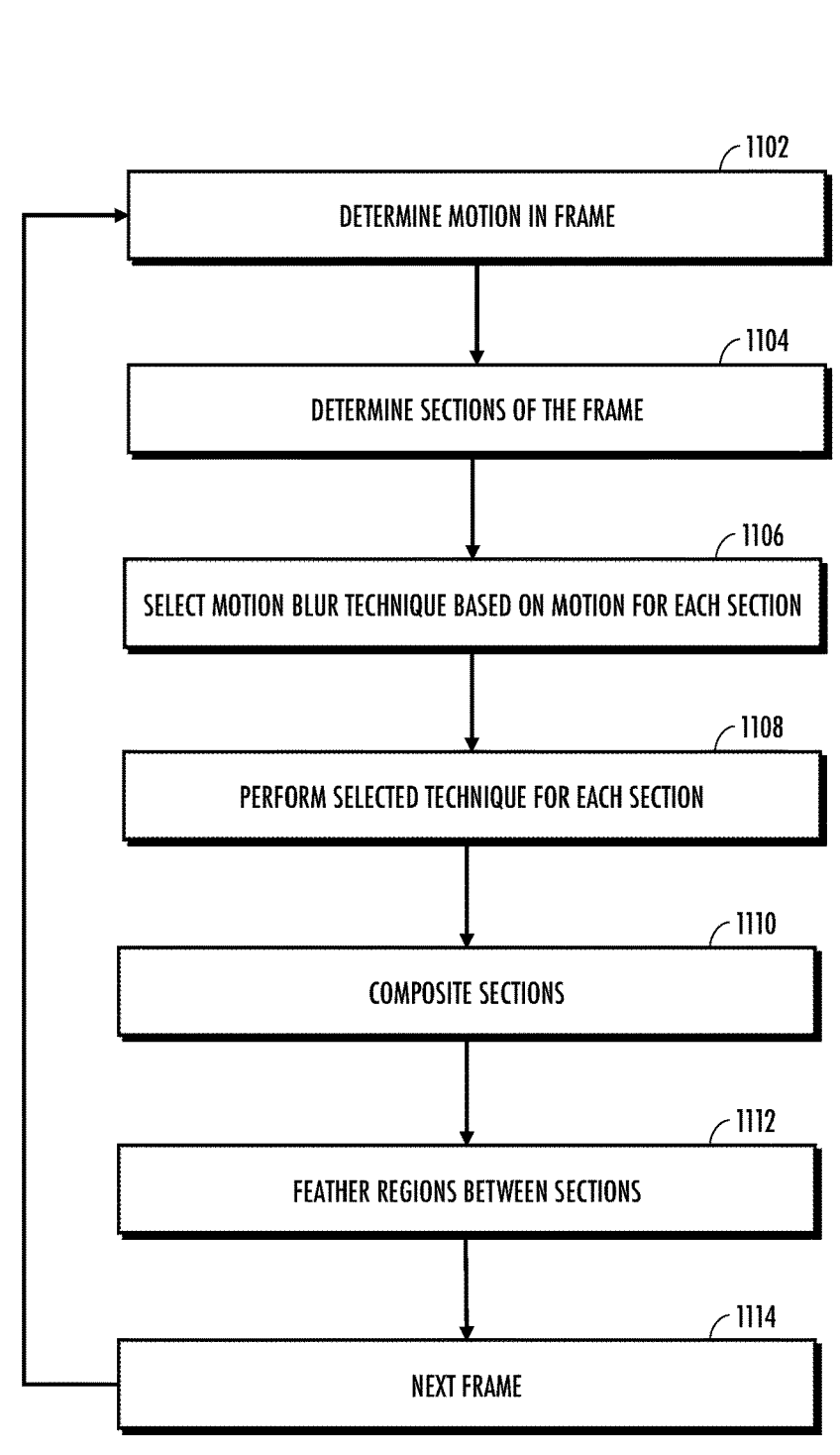
FIG. 11 illustrates an exemplary logical flow diagram of a technique for adding motion blur to a frame of video according to aspects of the present disclosure.

FIG. 11 illustrates an exemplary logical flow diagram of a technique for adding motion blur to sections of a frame according to aspects of the present disclosure. The steps of method 1100 may be performed "in-camera" during capture, or after capture with a post-processing device. In method 1100, frames are triaged to determine sections of high motion and low motion. Different techniques for adding motion blur are applied to different sections, based on their motion. The resulting blurred sections may be composited to create a final frame.

At step 1102, a device may determine an amount of motion in a frame. The determination may be made by performing optical flow on consecutive frames of the video. The optical flow can determine pixel, block, or object movement between frames. Motion vectors may be generated based on the determined optical flow.

At step 1104, the device may sub-divide the frame into sections based on motion information (e.g., the determined motion vectors). The sections of the frame may be based on areas of high-motion, areas of low-motion, and/or areas of no motion. More broadly, multiple categories may be used (e.g., high-quality, medium-quality, low-quality, etc.). Sections of the frame may be divided at individual pixels, blocks in a frame, or edges of objects. Notably, certain types of objects may be detected with specialized algorithms (facial detection, object recognition, etc.); the edges of the objects may be used as boundaries for the sections.

At step 1106, the device may select a motion blur technique based on the determined motion in each of the sections. For example, some sections (e.g., without motion) may receive no motion blur, areas of low motion may be rendered with motion blur using a fast-rendering technique (e.g., vector blur), areas of medium motion and high motion may be blurred using a combined vector blur and stacked frame interpolation with various levels of interpolation (e.g., 2×, 4×, 8×, etc.).

The device may perform the selected technique on each section, at step 1108. In some examples, each section is treated individually. In other examples, all sections with a commonly selected motion blur technique may be blurred at the same time. In further examples, only contiguous sections with the same selected motion blur technique may be blurred at the same time.

At step 1110, the device composites the generated sections. In some examples, pixel values of the different sections are weighted. For example, a binary "mask" might use 1 for pixels within the section of the frame and 0 for pixels outside the section. A combination of the weighted pixel values may be generated.

At step 1112, boundaries between sections/areas of differing techniques are blended or feathered by the device. This may ensure that the final generated frame does not have harsh edges from compositing the different regions of the frame after disparate techniques are used.

Once blended, the device can move to the next frame (step 1114).

Technological Improvements and Other Considerations

The above-described system and method solves a technological problem in industry practice related to video post-processing. Conventional post-processing techniques relied on the filmmaker to select and stage their shots, so that the short sections of footage could be post-processed according to the technique that best suits the intended effect. However, action photography has unique demands and constraints which may result in e.g., less or no control of the scene and/or shooting length. In other words, the various solutions directly address problems that are introduced by conventional blurring techniques used in isolation. Specifically, vector blur of intermediate frames reduces ghosting and strobing of sharp frames (which would otherwise be introduced during conventional frame interpolation). Similarly, frame stacking during the frame interpolation process may remove or avoid unintentionally blurred foreground and background artifacts that might be introduced by conventional vector blur techniques alone. More directly, the technique described above overcomes a problem that was introduced by, and rooted in, the unconventional nature of action photography.

Additionally, conventional post-processing has historically been sparingly used in high performance workstations which are insensitive to processing/memory loads. The techniques described throughout allow for adaptive post-processing based on motion information (e.g., captured in-camera, or inferred with optical flow analysis). The ability to throttle-up/throttle-down post-processing complexity enables high-quality results even on platforms that have limited power, processing, and/or memory. More directly, the techniques described throughout enable improvements to the operation of a computer, particularly those of a mobile/embedded nature.

Moreover, the exemplary combination does not merely combine two well-known techniques in any arbitrary order. Frame interpolation with frame stacking is generally considered to be a higher quality post-processing technique relative to vector blur. Thus, conventional wisdom would not combine these two techniques as described throughout. In other words, performing a low-quality blur over a high-quality blur would ostensibly only introduce undesirable noise. However, the foregoing techniques use an "ordered combination" to preserve foreground/background information of the intermediate frames (before stacking) during the vector blur. In other words, the ordered combination is both an unconventional and specific technical solution.

Exemplary Architecture

System Architecture

Figure 12:
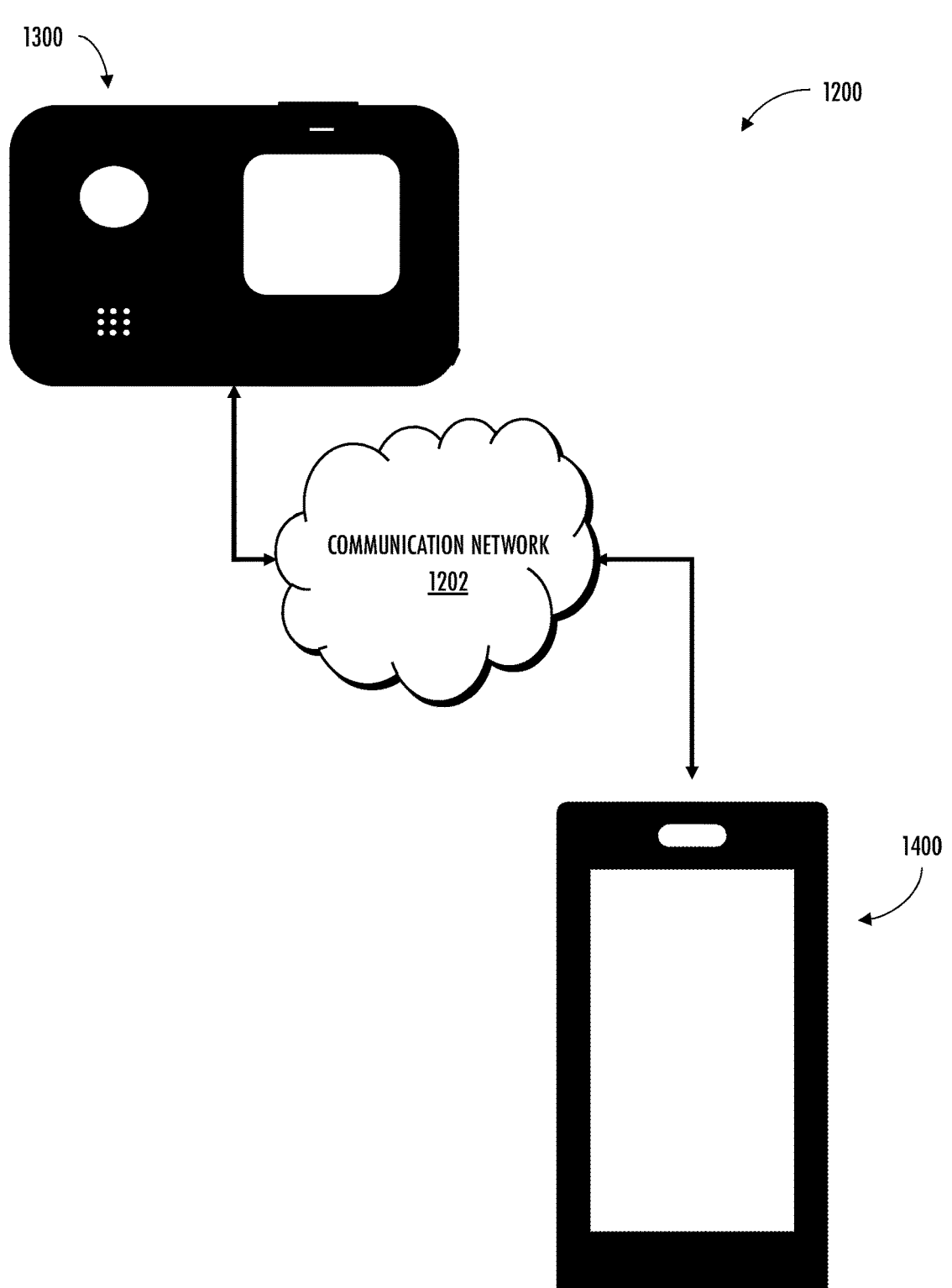
FIG. 12 is a logical block diagram of the exemplary system architecture, in accordance with various aspects of the present disclosure.

FIG. 12 is a logical block diagram of the exemplary system 1200 that includes: a capture device 1300, a post-processing device 1400, and a communication network 1202. The capture device 1300 may capture one or more videos or frames of videos and transfer the videos to the post-processing device 1400 directly or via communication network 1202 for post-processing to add, e.g., motion blur to captured video. The post-processed video may be shared with additional devices via communication network 1202.

The following discussion provides functional descriptions for each of the logical entities of the exemplary system 1200. Artisans of ordinary skill in the related art will readily appreciate that other logical entities that do the same work in substantially the same way to accomplish the same result are equivalent and may be freely interchanged. A specific discussion of the structural implementations, internal operations, design considerations, and/or alternatives, for each of the logical entities of the exemplary system 1200 is separately provided below.

Functional Overview of the Capture Device

Functionally, a capture device 1300 captures and processes video. The captured video may include high-frame rate video for better application of other post processing effects such as electronic image stabilization and slow-motion techniques. In certain implementations, the capture device captures and processes the video to include post-capture motion blur. In other implementations, the capture device 1300 captures video that is transferred to a post-processing device for further processing, including adding post-processing motion blur to the video.

The techniques described throughout may be broadly applicable to capture devices such as cameras including action cameras, digital cameras, digital video cameras; cellular phones; laptops; smart watches; and/or IoT devices. For example, a smart phone or laptop may be able to capture and process video. Various other applications may be substitute with equal success by artisans of ordinary skill, given the contents of the present disclosure.

Figure 13:
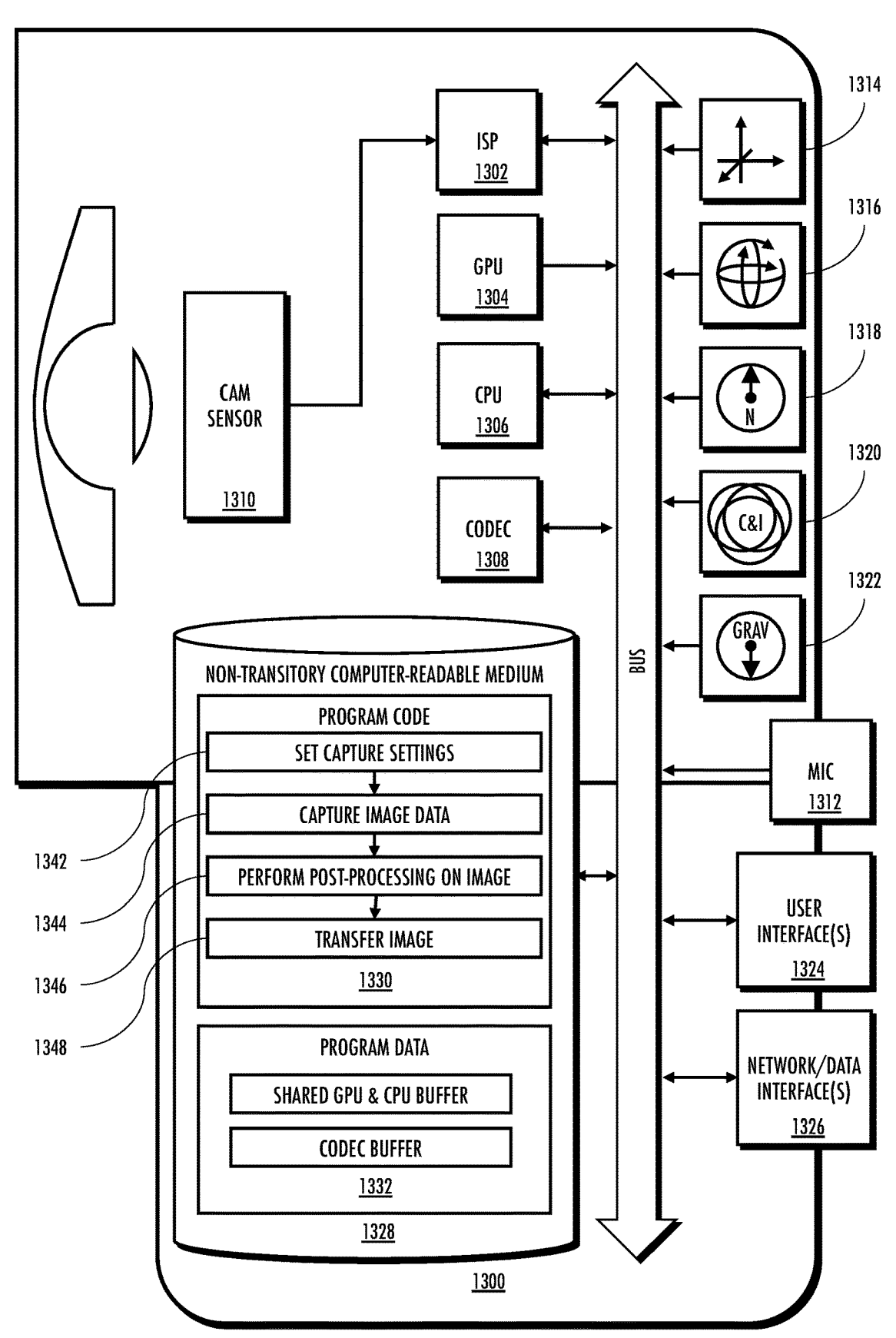
FIG. 13 is a logical block diagram of an exemplary capture device, in accordance with various aspects of the present disclosure.

FIG. 13 is a logical block diagram of an exemplary capture device 1300. The capture device 1300 includes: a sensor subsystem, a user interface subsystem, a communication subsystem, a control and data subsystem, and a bus to enable data transfer. The following discussion provides a specific discussion of the internal operations, design considerations, and/or alternatives, for each subsystem of the exemplary capture device 1300.

Functional Overview of the Sensor Subsystem

Functionally, the sensor subsystem senses the physical environment and captures and/or records the sensed environment as data. In some embodiments, the sensor data may be stored as a function of capture time (so-called "tracks"). Tracks may be synchronous (aligned) or asynchronous (non-aligned) to one another. In some embodiments, the sensor data may be compressed, encoded, and/or encrypted as a data structure (e.g., MPEG, WAV, etc.)

The illustrated sensor subsystem includes: a camera sensor 1310, a microphone 1312, an accelerometer (ACCL 1314), a gyroscope (GYRO 1316), and a magnetometer (MAGN 1318).

Other sensor subsystem implementations may multiply, combine, further sub-divide, augment, and/or subsume the foregoing functionalities within these or other subsystems. For example, two or more cameras may be used to capture panoramic (e.g., wide or 360°) or stereoscopic content. Similarly, two or more microphones may be used to record stereo sound.

In some embodiments, the sensor subsystem is an integral part of the capture device 1300. In other embodiments, the sensor subsystem may be augmented by external devices and/or removably attached components (e.g., hot-shoe/cold-shoe attachments, etc.) The following sections provide detailed descriptions of the individual components of the sensor subsystem.

Camera Implementations and Design Considerations

In one exemplary embodiment, a camera lens bends (distorts) light to focus on the camera sensor 1310. In one specific implementation, the optical nature of the camera lens is mathematically described with a lens polynomial. More generally however, any characterization of the camera lens' optical properties may be substituted with equal success; such characterizations may include without limitation: polynomial, trigonometric, logarithmic, look-up-table, and/or piecewise or hybridized functions thereof. In one variant, the camera lens provides a wide field-of-view greater than 90°; examples of such lenses may include e.g., panoramic lenses 120° and/or hyper-hemispherical lenses 180°.

In one specific implementation, the camera sensor 1310 senses light (luminance) via photoelectric sensors (e.g., CMOS sensors). A color filter array (CFA) value provides a color (chrominance) that is associated with each sensor. The combination of each luminance and chrominance value provides a mosaic of discrete red, green, blue value/positions, that may be "demosaiced" to recover a numeric tuple (RGB, CMYK, YUV, YCrCb, etc.) for each pixel of an image.

More generally however, the various techniques described herein may be broadly applied to any camera assembly; including e.g., narrow field-of-view (30° to 90°) and/or stitched variants (e.g., 360° panoramas). While the foregoing techniques are described in the context of perceptible light, the techniques may be applied to other EM radiation capture and focus apparatus including without limitation: infrared, ultraviolet, and/or X-ray, etc.

As a brief aside, "exposure" is based on three parameters: aperture, ISO (sensor gain) and shutter speed (exposure time). Exposure determines how light or dark an image will appear when it's been captured by the camera(s). During normal operation, a digital camera may automatically adjust one or more settings including aperture, ISO, and shutter speed to control the amount of light that is received. Most action cameras are fixed aperture cameras due to form factor limitations and their most common use cases (varied lighting conditions)—fixed aperture cameras only adjust ISO and shutter speed. Traditional digital photography allows a user to set fixed values and/or ranges to achieve desirable aesthetic effects (e.g., shot placement, blur, depth of field, noise, etc.).

The term "shutter speed" refers to the amount of time that light is captured. Historically, a mechanical "shutter" was used to expose film to light; the term shutter is still used, even in digital cameras that lack of such mechanisms. For example, some digital cameras use an electronic rolling shutter (ERS) that exposes rows of pixels to light at slightly different times during the image capture. Specifically, CMOS image sensors use two pointers to clear and write to each pixel value. An erase pointer discharges the photosensitive cell (or rows/columns/arrays of cells) of the sensor to erase it; a readout pointer then follows the erase pointer to read the contents of the photosensitive cell/pixel. The capture time is the time delay in between the erase and readout pointers. Each photosensitive cell/pixel accumulates the light for the same exposure time, but they are not erased/read at the same time since the pointers scan through the rows. A faster shutter speed has a shorter capture time, a slower shutter speed has a longer capture time.

A related term, "shutter angle" describes the shutter speed relative to the frame rate of a video. A shutter angle of 360° means all the motion from one video frame to the next is captured, e.g., video with 24 frames per second (FPS) using a 360° shutter angle will expose the photosensitive sensor for $\frac{1}{24}^{th}$ of a second. Similarly, 120 FPS using a 360° shutter angle exposes the photosensitive sensor $\frac{1}{120}$th of a second. In low light, the camera will typically expose longer, increasing the shutter angle, resulting in more motion blur. Larger shutter angles result in softer and more fluid motion, since the end of blur in one frame extends closer to the start of blur in the next frame. Smaller shutter angles appear stuttered and disjointed since the blur gap increases between the discrete frames of the video. In some cases, smaller shutter angles may be desirable for capturing crisp details in each frame. For example, the most common setting for cinema has been a shutter angle near 180°, which equates to a shutter speed near $\frac{1}{48}^{th}$ of a second at 24 FPS. Some users may use other shutter angles that mimic old 1950's newsreels (shorter than 180°).

In some embodiments, the camera resolution directly corresponds to light information. In other words, the Bayer sensor may match one pixel to a color and light intensity (each pixel corresponds to a photosite). However, in some embodiments, the camera resolution does not directly correspond to light information. Some high-resolution cameras use an N-Bayer sensor that groups four, or even nine, pixels per photosite. During image signal processing, color information is re-distributed across the pixels with a technique called "pixel binning". Pixel-binning provides better results and versatility than just interpolation/upscaling. For example, a camera can capture high resolution images (e.g., 108 MPixels) in full-light; but in low-light conditions, the camera can emulate a much larger photosite with the same sensor (e.g., grouping pixels in sets of 9 to get a 12 MPixel "nona-binned" resolution). Unfortunately, cramming photosites together can result in "leaks" of light between adjacent pixels (i.e., sensor noise). In other words, smaller sensors and small photosites increase noise and decrease dynamic range.

Microphone Implementations and Design Considerations

In one specific implementation, the microphone 1312 senses acoustic vibrations and converts the vibrations to an electrical signal (via a transducer, condenser, etc.) The electrical signal may be further transformed to frequency domain information. The electrical signal is provided to the audio codec, which samples the electrical signal and converts the time domain waveform to its frequency domain representation. Typically, additional filtering and noise reduction may be performed to compensate for microphone characteristics. The resulting audio waveform may be compressed for delivery via any number of audio data formats.

Commodity audio codecs generally fall into speech codecs and full spectrum codecs. Full spectrum codecs use the modified discrete cosine transform (mDCT) and/or mel-frequency cepstral coefficients (MFCC) to represent the full audible spectrum. Speech codecs reduce coding complexity by leveraging the characteristics of the human auditory/speech system to mimic voice communications. Speech codecs often make significant trade-offs to preserve intelligibility, pleasantness, and/or data transmission considerations (robustness, latency, bandwidth, etc.)

More generally however, the various techniques described herein may be broadly applied to any integrated or handheld microphone or set of microphones including, e.g., boom and/or shotgun-style microphones. While the foregoing techniques are described in the context of a single microphone, multiple microphones may be used to collect stereo sound and/or enable audio processing. For example, any number of individual microphones can be used to constructively and/or destructively combine acoustic waves (also referred to as beamforming).

Inertial Measurement Unit (IMU) Implementations and Design Considerations

The inertial measurement unit (IMU) includes one or more accelerometers, gyroscopes, and/or magnetometers. In one specific implementation, the accelerometer (ACCL 1314) measures acceleration and gyroscope (GYRO 1316) measure rotation in one or more dimensions. These measurements may be mathematically converted into a four-dimensional (4D) quaternion to describe the device motion, and electronic image stabilization (EIS) may be used to offset image orientation to counteract device motion (e.g., CORI/IORI 1320). In one specific implementation, the magnetometer (MAGN 1318) may provide a magnetic north vector (which may be used to "north lock" video and/or augment location services such as GPS), similarly the accelerometer (ACCL 1314) may also be used to calculate a gravity vector (GRAV 1322).

Typically, an accelerometer uses a damped mass and spring assembly to measure proper acceleration (i.e., acceleration in its own instantaneous rest frame). In many cases, accelerometers may have a variable frequency response. Most gyroscopes use a rotating mass to measure angular velocity; a MEMS (microelectromechanical) gyroscope may use a pendulum mass to achieve a similar effect by measuring the pendulum's perturbations. Most magnetometers use a ferromagnetic element to measure the vector and strength of a magnetic field; other magnetometers may rely on induced currents and/or pickup coils. The IMU uses the acceleration, angular velocity, and/or magnetic information to calculate quaternions that define the relative motion of an object in four-dimensional (4D) space. Quaternions can be efficiently computed to determine velocity (both device direction and speed).

More generally, however, any scheme for detecting device velocity (direction and speed) may be substituted with equal success for any of the foregoing tasks. While the foregoing techniques are described in the context of an inertial measurement unit (IMU) that provides quaternion vectors, artisans of ordinary skill in the related arts will readily appreciate that raw data (acceleration, rotation, magnetic field) and any of their derivatives may be substituted with equal success.

Functional Overview of the User Interface Subsystem

Functionally, the user interface subsystem 1324 may be used to present media to, and/or receive input from, a human user. Media may include any form of audible, visual, and/or haptic content for consumption by a human. Examples include images, videos, sounds, and/or vibration. Input may include any data entered by a user either directly (via user entry) or indirectly (e.g., by reference to a profile or other source).

The illustrated user interface subsystem 1324 may include: a touchscreen, physical buttons, and a microphone. In some embodiments, input may be interpreted from touchscreen gestures, button presses, device motion, and/or commands (verbally spoken). The user interface subsystem may include physical components (e.g., buttons, keyboards, switches, scroll wheels, etc.) or virtualized components (via a touchscreen).

Other user interface subsystem 1324 implementations may multiply, combine, further sub-divide, augment, and/or subsume the foregoing functionalities within these or other subsystems. For example, the audio input may incorporate elements of the microphone (discussed above with respect to the sensor subsystem). Similarly, IMU based input may incorporate the aforementioned IMU to measure "shakes", "bumps" and other gestures.

In some embodiments, the user interface subsystem 1324 is an integral part of the capture device 1300. In other embodiments, the user interface subsystem may be augmented by external devices (such as the post-processing device 1400, discussed below) and/or removably attached components (e.g., hot-shoe/cold-shoe attachments, etc.) The following sections provide detailed descriptions of the individual components of the sensor subsystem.

Touchscreen and Buttons Implementation and Design Considerations

In some embodiments, the user interface subsystem 1324 may include a touchscreen panel. A touchscreen is an assembly of a touch-sensitive panel that has been overlaid on a visual display. Typical displays are liquid crystal displays (LCD), organic light emitting diodes (OLED), and/or active-matrix OLED (AMOLED). Touchscreens are commonly used to enable a user to interact with a dynamic display, this provides both flexibility and intuitive user interfaces. Within the context of action cameras, touchscreen displays are especially useful because they can be sealed (waterproof, dust-proof, shock-proof, etc.)

Most commodity touchscreen displays are either resistive or capacitive. Generally, these systems use changes in resistance and/or capacitance to sense the location of human finger(s) or other touch input. Other touchscreen technologies may include, e.g., surface acoustic wave, surface capacitance, projected capacitance, mutual capacitance, and/or self-capacitance. Yet other analogous technologies may include, e.g., projected screens with optical imaging and/or computer-vision.

In some embodiments, the user interface subsystem 1324 may also include mechanical buttons, keyboards, switches, scroll wheels and/or other mechanical input devices. Mechanical user interfaces are usually used to open or close a mechanical switch, resulting in a differentiable electrical signal. While physical buttons may be more difficult to seal against the elements, they are nonetheless useful in low-power applications since they do not require an active electrical current draw. For example, many BLE applications may be triggered by a physical button press to further reduce GUI power requirements.

More generally, however, any scheme for detecting user input may be substituted with equal success for any of the foregoing tasks. While the foregoing techniques are described in the context of a touchscreen and physical buttons that enable user data entry, artisans of ordinary skill in the related arts will readily appreciate that any of their derivatives may be substituted with equal success.

Microphone/Speaker Implementation and Design Considerations

Audio input may incorporate a microphone and codec (discussed above) with a speaker. As previously noted, the microphone can capture and convert audio for voice commands. For audible feedback, the audio codec may obtain audio data and decode the data into an electrical signal. The electrical signal can be amplified and used to drive the speaker to generate acoustic waves.

As previously noted, the microphone and speaker may have any number of microphones and/or speakers for beamforming. For example, two speakers may be used to provide stereo sound. Multiple microphones may be used to collect both the user's vocal instructions as well as the environmental sounds.

Functional Overview of the Communication Subsystem

Functionally, the communication subsystem may be used to transfer data to, and/or receive data from, external entities. The communication subsystem is generally split into network interfaces and removeable media (data) interfaces. The network interfaces are configured to communicate with other nodes of a communication network according to a communication protocol. Data may be received/transmitted as transitory signals (e.g., electrical signaling over a transmission medium.) The data interfaces are configured to read/write data to a removeable non-transitory computer-readable medium (e.g., flash drive or similar memory media).

The illustrated network/data interface 1326 may include network interfaces including, but not limited to: Wi-Fi, Bluetooth, Global Positioning System (GPS), USB, and/or Ethernet network interfaces. Additionally, the network/data interface 1326 may include data interfaces such as: SD cards (and their derivatives) and/or any other optical/electrical/magnetic media (e.g., MMC cards, CDs, DVDs, tape, etc.)

Network Interface Implementation and Design Considerations

The communication subsystem including the network/data interface 1326 of the capture device 1300 may include one or more radios and/or modems. As used herein, the term "modem" refers to a modulator-demodulator for converting computer data (digital) into a waveform (baseband analog). The term "radio" refers to the front-end portion of the modem that upconverts and/or downconverts the baseband analog waveform to/from the RF carrier frequency.

As previously noted, communication subsystem with network/data interface 1326 may include wireless subsystems (e.g., 5th/6th Generation (5G/6G) cellular networks, Wi-Fi, Bluetooth (including, Bluetooth Low Energy (BLE) communication networks), etc.) Furthermore, the techniques described throughout may be applied with equal success to wired networking devices. Examples of wired communications include without limitation Ethernet, USB, PCI-e. Additionally, some applications may operate within mixed environments and/or tasks. In such situations, the multiple different connections may be provided via multiple different communication protocols. Still other network connectivity solutions may be substituted with equal success.

More generally, any scheme for transmitting data over transitory media may be substituted with equal success for any of the foregoing tasks.

Data Interface Implementation and Design Considerations

The communication subsystem of the capture device 1300 may include one or more data interfaces for removeable media. In one exemplary embodiment, the capture device 1300 may read and write from a Secure Digital (SD) card or similar card memory.

While the foregoing discussion is presented in the context of SD cards, artisans of ordinary skill in the related arts will readily appreciate that other removeable media may be substituted with equal success (flash drives, MMC cards, etc.) Furthermore, the techniques described throughout may be applied with equal success to optical media (e.g., DVD, CD-ROM, etc.).

More generally, any scheme for storing data to non-transitory media may be substituted with equal success for any of the foregoing tasks.

Functional Overview of the Control and Data Processing Subsystem

Functionally, the control and data processing subsystems are used to read/write and store data to effectuate calculations and/or actuation of the sensor subsystem, user interface subsystem, and/or communication subsystem. While the following discussions are presented in the context of processing units that execute instructions stored in a non-transitory computer-readable medium (memory), other forms of control and/or data may be substituted with equal success, including e.g., neural network processors, dedicated logic (field programmable gate arrays (FPGAs), application specific integrated circuits (ASICs)), and/or other software, firmware, and/or hardware implementations.

As shown in FIG. 13, the control and data subsystem may include one or more of: a central processing unit (CPU 1306), an image signal processor (ISP 1302), a graphics processing unit (GPU 1304), a codec 1308, and a non-transitory computer-readable medium 1328 that stores program instructions and/or data.

Processor-Memory Implementations and Design Considerations

As a practical matter, different processor architectures attempt to optimize their designs for their most likely usages. More specialized logic can often result in much higher performance (e.g., by avoiding unnecessary operations, memory accesses, and/or conditional branching). For example, a general-purpose CPU (such as shown in FIG. 13) may be primarily used to control device operation and/or perform tasks of arbitrary complexity/best-effort. CPU operations may include, without limitation: general-purpose operating system (OS) functionality (power management, UX), memory management, etc. Typically, such CPUs are selected to have relatively short pipelining, longer words (e.g., 32-bit, 64-bit, and/or super-scalar words), and/or addressable space that can access both local cache memory and/or pages of system virtual memory. More directly, a CPU may often switch between tasks, and must account for branch disruption and/or arbitrary memory access.

In contrast, the image signal processor (ISP) performs many of the same tasks repeatedly over a well-defined data structure. Specifically, the ISP maps captured camera sensor data to a color space. ISP operations often include, without limitation: demosaicing, color correction, white balance, and/or autoexposure. Most of these actions may be done with scalar vector-matrix multiplication. Raw image data has a defined size and capture rate (for video) and the ISP operations are performed identically for each pixel; as a result, ISP designs are heavily pipelined (and seldom branch), may incorporate specialized vector-matrix logic, and often rely on reduced addressable space and other task-specific optimizations. ISP designs only need to keep up with the camera sensor output to stay within the real-time budget; thus, ISPs more often benefit from larger register/data structures and do not need parallelization. In many cases, the ISP may locally execute its own real-time operating system (RTOS) to schedule tasks of according to real-time constraints.

Much like the ISP, the GPU is primarily used to modify image data and may be heavily pipelined (seldom branches) and may incorporate specialized vector-matrix logic. Unlike the ISP however, the GPU often performs image processing acceleration for the CPU, thus the GPU may need to operate on multiple images at a time and/or other image processing tasks of arbitrary complexity. In many cases, GPU tasks may be parallelized and/or constrained by real-time budgets. GPU operations may include, without limitation: stabilization, lens corrections (stitching, warping, stretching), image corrections (shading, blending), noise reduction (filtering, etc.). GPUs may have much larger addressable space that can access both local cache memory and/or pages of system virtual memory. Additionally, a GPU may include multiple parallel cores and load balancing logic to e.g., manage power consumption and/or performance. In some cases, the GPU may locally execute its own operating system to schedule tasks according to its own scheduling constraints (pipelining, etc.).

The hardware codec converts image data to an encoded data for transfer and/or converts encoded data to image data for playback. Much like ISPs, hardware codecs are often designed according to specific use cases and heavily commoditized. Typical hardware codecs are heavily pipelined, may incorporate discrete cosine transform (DCT) logic (which is used by most compression standards), and often have large internal memories to hold multiple frames of video for motion estimation (spatial and/or temporal). As with ISPs, codecs are often bottlenecked by network connectivity and/or processor bandwidth, thus codecs are seldom parallelized and may have specialized data structures (e.g., registers that are a multiple of an image row width, etc.). In some cases, the codec may locally execute its own operating system to schedule tasks according to its own scheduling constraints (bandwidth, real-time frame rates, etc.).

Other processor subsystem implementations may multiply, combine, further sub-divide, augment, and/or subsume the foregoing functionalities within these or other processing elements. For example, multiple ISPs may be used to service multiple camera sensors. Similarly, codec functionality may be subsumed with either GPU or CPU operation via software emulation.

In one embodiment, the memory subsystem may be used to store data locally at the capture device 1300. In one exemplary embodiment, data may be stored as non-transitory symbols (e.g., bits read from non-transitory computer-readable mediums.) In one specific implementation, the memory subsystem including non-transitory computer-readable medium 1328 is physically realized as one or more physical memory chips (e.g., NAND/NOR flash) that are logically separated into memory data structures. The memory subsystem may be bifurcated into program code 1330 and/or program data 1332. In some variants, program code and/or program data may be further organized for dedicated and/or collaborative use. For example, the GPU and CPU may share a common memory buffer to facilitate large transfers of data therebetween. Similarly, the codec may have a dedicated memory buffer to avoid resource contention.

In some embodiments, the program code may be statically stored within the capture device 1300 as firmware. In other embodiments, the program code may be dynamically stored (and changeable) via software updates. In some such variants, software may be subsequently updated by external parties and/or the user, based on various access permissions and procedures.

Generalized Operation of the Capture Device

In one embodiment, the non-transitory computer-readable medium includes a routine that enables the capture of video for adding motion blur in post-processing. In some examples, the capture device may perform parts or all of the post-processing on the device. In other examples, the capture device may transfer the video to another device for additional processing. When executed by the control and data subsystem, the routine causes the capture device to: set capture settings, capture image data, perform post-processing on the image data, and transfer the image data to a post-processing device. These steps are discussed in greater detail below.

At step 1342, the capture device may set capture settings. Capture settings may be retrieved via user input at the user interface subsystem 1324. Settings may also be determined via sensor data using the sensor subsystem to determine exposure settings, a camera mode may alter or constrain capture settings (e.g., an automatic mode, priority modes, a slow-motion capture mode, etc.). In some variants, capture settings may be based on intended post-processing effects.

In one embodiment, the capture settings may be different from the intended playback settings. Differences in capture and playback frame rates may allow certain effects to be added in post-processing (e.g., slow-motion effects and stabilization). For example, some cameras have a slow-motion capture mode that captures frames at a relatively high capture frame rate but encodes the video for playback at a slower playback frame rate to create the slow-motion effect.

At step 1344, the capture device may capture video using the camera sensor 1310 with the capture settings. The capture device may perform processing of the captured images using the control and data subsystem including the ISP 1302. The video may be encoded using codec 1308.

In some implementations, depth may be explicitly determined based on a depth sensor or derived from a stereo camera setup. As previously noted, depth information may improve downstream post-processing. For example, depth maps can be used to discern between objects that pass in front of and behind other objects in a scene. This may be used to prevent inadvertent vector blur artifacts (e.g., due to foreground and background objects that move at different velocities relative to the camera). Additionally, depth information may be used to make certain background frames or objects transparent during frame stacking. In other words, depth maps may help ameliorate issues of overlapping motion that can create ghosting artifacts.

At step 1346, the capture device may perform post-processing on video. Post-processing may include image/video stabilization, adding slow motion effects, scaling a video playback, and adding post-capture motion blur effects (as discussed herein).

At step 1348, the capture device may transfer video. The captured video may be stored on internal or removable storage and transferred using wired or wireless mechanisms (via the network/data interface 1326) or via transferring the removable storage to another device (e.g., the post-processing device 1400).

While the foregoing actions are presented in the context of a capture device that capture video for adding post-processing motion blur, those of ordinary skill in the related arts will readily appreciate that the actions may be broadly extended to many different use cases (including, e.g., for performing other post-processing activities and sharing/viewing captured media).

Functional Overview of the Post-Processing Device

Functionally, a post-processing device refers to a device that can receive and process image/video data. The post-processing device has many similarities in operation and implementation to the capture device 1300 which are not further discussed; the following discussion provides a discussion of the internal operations, design considerations, and/or alternatives, that are specific to post-processing device operation. Additionally, certain actions performed by the post-processing device may be performed by the capture device 1300.

Figure 14:
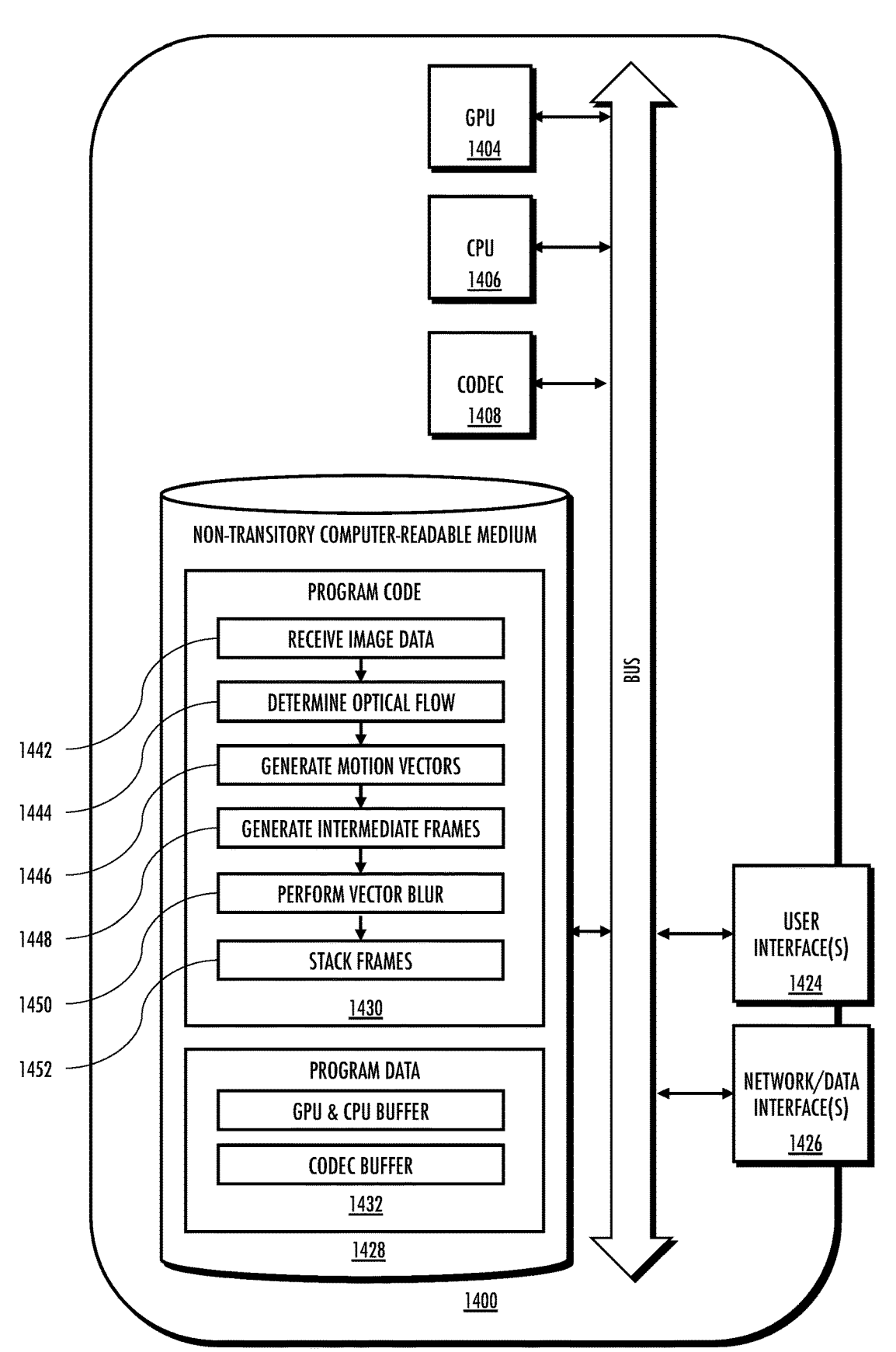
FIG. 14 is a logical block diagram of an exemplary post-processing device, in accordance with various aspects of the present disclosure.

FIG. 14 is a logical block diagram of an exemplary post-processing device 1400. The post-processing device 1400 includes: a user interface subsystem, a communication subsystem, a control and data subsystem, and a bus to enable data transfer. The following discussion provides a specific discussion of the internal operations, design considerations, and/or alternatives, for each subsystem of the exemplary post-processing device 1400.

Functional Overview of the User Interface Subsystem

Functionally, the user interface subsystem 1424 may be used to present media to, and/or receive input from, a human user. Media may include any form of audible, visual, and/or haptic content for consumption by a human. Examples include images, videos, sounds, and/or vibration. Input may include any data entered by a user either directly (via user entry) or indirectly (e.g., by reference to a profile or other source).

The illustrated user interface subsystem 1424 may include: a touchscreen, physical buttons, and a microphone. In some embodiments, input may be interpreted from touchscreen gestures, button presses, device motion, and/or commands (verbally spoken). The user interface subsystem may include physical components (e.g., buttons, keyboards, switches, scroll wheels, etc.) or virtualized components (via a touchscreen).

User Interface Subsystem Considerations for Different Device Types

The illustrated user interface subsystem 1424 may include user interfaces that are typical of the specific device types which include, but are not limited to: a desktop computer, a network server, a smart phone, and a variety of other devices are commonly used in the mobile device ecosystem including without limitation: laptops, tablets, smart phones, smart watches, smart glasses, and/or other electronic devices. These different device-types often come with different user interfaces and/or capabilities.

In laptop embodiments, user interface devices may include both keyboards, mice, touchscreens, microphones and/speakers. Laptop screens are typically quite large, providing display sizes well more than 2K (2560×1440), 4K (3840×2160), and potentially even higher. In many cases, laptop devices are less concerned with outdoor usage (e.g., water resistance, dust resistance, shock resistance) and often use mechanical button presses to compose text and/or mice to maneuver an on-screen pointer.

In terms of overall size, tablets are like laptops and may have display sizes well more than 2K (2560×1440), 4K (3840×2160), and potentially even higher. Tablets tend to eschew traditional keyboards and rely instead on touch-screen and/or stylus inputs.

Smart phones are smaller than tablets and may have display sizes that are significantly smaller, and non-standard. Common display sizes include e.g., 2400×1080, 2556×1179, 2796×1290, etc. Smart phones are highly reliant on touch-screens but may also incorporate voice inputs. Virtualized keyboards are quite small and may be used with assistive programs (to prevent mis-entry).

Smart watches and smart glasses have not had widespread market adoption but will likely become more popular over time. Their user interfaces are currently quite diverse and highly subject to implementation.

Functional Overview of the Communication Subsystem

Functionally, the communication subsystem may be used to transfer data to, and/or receive data from, external entities. The communication subsystem is generally split into network interfaces and removeable media (data) interfaces. The network interfaces are configured to communicate with other nodes of a communication network according to a communication protocol. Data may be received/transmitted as transitory signals (e.g., electrical signaling over a transmission medium.) In contrast, the data interfaces are configured to read/write data to a removeable non-transitory computer-readable medium (e.g., flash drive or similar memory media).

The illustrated network/data interface 1426 of the communication subsystem may include network interfaces including, but not limited to: Wi-Fi, Bluetooth, Global Positioning System (GPS), USB, and/or Ethernet network interfaces. Additionally, the network/data interface 1426 may include data interfaces such as: SD cards (and their derivatives) and/or any other optical/electrical/magnetic media (e.g., MMC cards, CDs, DVDs, tape, etc.)

Functional Overview of the Control and Data Processing Subsystem

Functionally, the control and data processing subsystems are used to read/write and store data to effectuate calculations and/or actuation of the user interface subsystem, and/or communication subsystem. While the following discussions are presented in the context of processing units that execute instructions stored in a non-transitory computer-readable medium (memory), other forms of control and/or data may be substituted with equal success, including e.g., neural network processors, dedicated logic (field programmable gate arrays (FPGAs), application specific integrated circuits (ASICs)), and/or other software, firmware, and/or hardware implementations.

As shown in FIG. 14, the control and data subsystem may include one or more of: a central processing unit (CPU 1406), a graphics processing unit (GPU 1404), a codec 1408, and a non-transitory computer-readable medium 1428 that stores program instructions (program code 1430) and/or program data 1432 (including a GPU buffer, a CPU buffer, and a codec buffer). In some examples, buffers may be shared between processing components to facilitate data transfer.

Generalized Operation of the Post-Processing Device

In one embodiment, the non-transitory computer-readable medium 1428 includes program code 1430 with instructions/a routine that performs post-processing, including adding motion blur to video. When executed by the control and data subsystem, the routine causes the post-processing device to: receive image data, determine optical flow on the video, generate motion vectors, generate intermediate frames, perform a vector blur, and stack the frames. These steps are discussed in greater detail below.

At step 1442, the post-processing device 1400 may receive video. In some embodiments, the video may be obtained via a removable storage media/a removable memory card or any network/data interface 1426. For instance, video from a capture device (e.g., capture device 1300) may be gathered by e.g., an internet server, a smartphone, a home computer, etc. and then transferred to the post-processing device via either wired or wireless transfer. The video may then be transferred to the non-transitory computer-readable medium 1428 for temporary storage during processing or for long term storage.

At step 1444, the post-processing device 1400 may determine optical flow on the video. The control and data subsystem may determine the optical flow by calculating the movement of pixels, blocks, or identified objects in a series of frames in the video.

In some implementations, optical flow may be calculated in the forward direction (e.g., from frame $F_1$ to frame $F_2$). In other implementations, optical flow and/or motion vectors are calculated instead or additionally in the reverse direction (e.g., from frame $F_2$ to frame $F_1$). Differences in motion vectors between the forward and reverse directions may be based on the optical flow calculation, object detection, movement between frames, pixel selection, and/or other motion estimation. In some implementations, a depth map may be indirectly inferred from the characteristics of the optical flow.

At step 1446, the post-processing device 1400 may generate motion vectors that denote motion between frames of the video. The determined optical flow may be used to generate the motion vectors via the control and data subsystem. The motion vectors may explain how a pixel/block/feature from a first frame moves to its new position in the second frame. Motion vectors may contain a magnitude value and a direction (e.g., an angle) or values for movement in the X-direction and Y-direction between subsequent frames and may be manipulated by the control and data subsystem.

In some embodiments, motion vectors may also be generated in the reverse direction to estimate "reverse" motion. Notably, the forward and reverse motion may be the same magnitude with the opposite direction for simple linear interpolation, however polynomial, non-linear, and/or artificial intelligence-based interpolation schemes may have significant differences in magnitude and/or direction.

Other techniques can also be used to estimate the motion of objects between frames. For example, neural network processing/artificial intelligence to address non-linear motion for frame interpolation. Such processing may be performed by the CPU 1406 or using dedicated Neural Network Processing Unit (NPU) of the control and data subsystem for dedicated AI processing.

At step 1448, the post-processing device 1400 may generate intermediate frames. Depending on the motion estimation technique, intermediate/interpolated frames may be generated from motion information in captured frames or may include motion information in previously generated intermediate/interpolated frames.

The settings for frame interpolation may be based on a variety of different factors such as e.g., user selection, capture frame rate, playback frame rate, desired image/video quality, motion estimation, and/or other operational factors (e.g., power consumption, available bandwidth, memory, etc.).

In some embodiments, the frame interpolation may be linear interpolation. In other embodiments, frame interpolation may use polynomial, neural network processing/artificial intelligence, or non-linear interpolation for frame interpolation. In some variants, the optical flow between input frames is first estimated, and then used synthesize intermediate frame(s). Still other approaches may merge these steps into a single convolution process to perform motion estimation and re-sampling (e.g., changing the frame rate by a factor) in a single step. In such examples, performing optical flow and generating motion vectors are not independently performed (or performed at all).

In some examples, additional intermediate frames may be generated using reverse motion information. The forward intermediate frames and the reverse intermediate frames may be combined, blended, or linearly averaged to generate a final intermediate frame. In yet another example, motion vectors in the forward and reverse directions may be combined, averaged, corrected, or otherwise reconciled and intermediate frame(s) may be generated using the combined motion vectors.

In some variants, optical flow, motion vector generation, and frame interpolation may be iteratively performed. For example, motion vectors between the captured frames may be used to generate a first and second intermediate frame in a first iteration. In a second iteration, the first motion vector (between the first captured frame and the first intermediate frame), and a second motion vector (between the first intermediate frame and the second captured frame) may be used with optical flow analysis to further improve the motion vector estimates. More directly, base motion vectors may be sub-divided into intermediate motion vectors in a first iteration; and subsequent iterations may further refine the intermediate motion vectors based on other frames and/or other smoothing input.

At step 1450, the post-processing device 1400 may perform a vector blur. As discussed above, the GPU 1404 may re-distribute pixel (color) values according to the distance traveled so that pixels that are static (e.g., null or 0 magnitude value motion vectors) remain unchanged while pixels with long (large magnitude) motion vectors are convolved/smeared in accordance with that motion vector/path.

At step 1452, the post-processing device 1400 may stack the frames. Generated intermediate frames may be stacked (along with data frame captured frames) to generate motion blur for a frame using, e.g., GPU 1404 of the control and data subsystem. The generated frame with motion blur may be created as a stack of semi-transparent images (generated interpolated frames and captured frames). The stacked frame combines the captured frame and intermediate frames.

Additionally, the post-processing device may perform other post-processing activities including generating slow-motion video and stabilization processes. Such processes may occur during (and using data generated via) adding motion blur to the video.

While the foregoing discussion is presented in the context of a specific order, other ordered combinations may be substituted with equal success. For example, vector blur may be performed prior to frame interpolation. In this example, intermediate frames are generated between blurred frames and then combined/stacked. As another example, vector blur may be performed after frame stacking. In this case, intermediate frames are stacked and the stacked image is blurred.

In still another alternative implementation, frame interpolation is performed prior to performing optical flow and motion vector generation. This may be beneficial when using an AI model that does not use optical flow/motion vectors as separate input from the images. In this example, optical flow and motion vector generation may be performed following generating intermediate frames (or skipped where motion vectors are output as part of generating the intermediate frames, e.g., when using certain AI models for frame interpolation). Motion vectors may then be used to perform the vector blur technique which may be followed by frame stacking to generate the final frame with added motion blur.

Functional Overview of the Communication Network

As used herein, a communication network 1202 refers to an arrangement of logical nodes that enables data communication between endpoints (an endpoint is also a logical node). Each node of the communication network may be addressable by other nodes; typically, a unit of data (a data packet) may be traverse across multiple nodes in "hops" (a segment between two nodes). Functionally, the communication network enables active participants (e.g., capture devices and/or post-processing devices) to communicate with one another.

Communication Networks, Implementation and Design Considerations

Aspects of the present disclosure may use an ad hoc communication network to, e.g., transfer data between the capture device 1300 and the post-processing device 1400. For example, USB or Bluetooth connections may be used to transfer data. Additionally, the capture device 1300 and the post-processing device 1400 may use more permanent communication network technologies (e.g., Bluetooth BR/EDR, Wi-Fi, 5G/6G cellular networks, etc.). For example, a capture device 1300 may use a Wi-Fi network (or other local area network) to transfer media (including video data) to a post-processing device 1400 (including e.g., a smart phone) or other device for processing and playback. In other examples, the capture device 1300 may use a cellular network to transfer media to a remote node over the Internet. These technologies are briefly discussed below.

So-called 5G cellular network standards are promulgated by the 3$^{rd}$ Generation Partnership Project (3GPP) consortium. The 3GPP consortium periodically publishes specifications that define network functionality for the various network components. For example, the 5G system architecture is defined in 3GPP TS 23.501 (*System Architecture for the 5G System* (*5GS*), version 17.5.0, published Jun. 15, 2022; incorporated herein by reference in its entirety). As another example, the packet protocol for mobility management and session management is described in 3GPP TS 24.501 (*Non-Access-Stratum* (*NAS*) *Protocol for 5G System* (*5G*); Stage 3, version 17.5.0, published Jan. 5, 2022; incorporated herein by reference in its entirety).

Currently, there are three main application areas for the enhanced capabilities of 5G. They are Enhanced Mobile Broadband (eMBB), Ultra Reliable Low Latency Communications (URLLC), and Massive Machine Type Communications (mMTC).

Enhanced Mobile Broadband (eMBB) uses 5G as a progression from 4G LTE mobile broadband services, with faster connections, higher throughput, and more capacity. eMBB is primarily targeted toward traditional "best effort" delivery (e.g., smart phones); in other words, the network does not provide any guarantee that data is delivered or that delivery meets any quality of service. In a best-effort network, all users obtain best-effort service such that the overall network is resource utilization is maximized. In these network slices, network performance characteristics such as network delay and packet loss depend on the current network traffic load and the network hardware capacity. When network load increases, this can lead to packet loss, retransmission, packet delay variation, and further network delay, or even timeout and session disconnect.

Ultra-Reliable Low-Latency Communications (URLLC) network slices are optimized for "mission critical" applications that require uninterrupted and robust data exchange. URLLC uses short-packet data transmissions which are easier to correct and faster to deliver. URLLC was originally envisioned to provide reliability and latency requirements to support real-time data processing requirements, which cannot be handled with best effort delivery.

Massive Machine-Type Communications (mMTC) was designed for Internet of Things (IoT) and Industrial Internet of Things (IIOT) applications. mMTC provides high connection density and ultra-energy efficiency. mMTC allows a single GNB to service many different devices with relatively low data requirements.

Wi-Fi is a family of wireless network protocols based on the IEEE 802.11 family of standards. Like Bluetooth, Wi-Fi operates in the unlicensed ISM band, and thus Wi-Fi and Bluetooth are frequently bundled together. Wi-Fi also uses a time-division multiplexed access scheme. Medium access is managed with carrier sense multiple access with collision avoidance (CSMA/CA). Under CSMA/CA. During Wi-Fi operation, stations attempt to avoid collisions by beginning transmission only after the channel is sensed to be "idle"; unfortunately, signal propagation delays prevent perfect channel sensing. Collisions occur when a station receives multiple signals on a channel at the same time and are largely inevitable. This corrupts the transmitted data and can require stations to re-transmit. Even though collisions prevent efficient bandwidth usage, the simple protocol and low cost has greatly contributed to its popularity. As a practical matter, Wi-F$_1$ access points have a usable range of ~50 ft indoors and are mostly used for local area networking in best-effort, high throughput applications.

Additional Configuration Considerations

Throughout this specification, some embodiments have used the expressions "comprises," "comprising," "includes," "including," "has," "having" or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein any reference to any of "one embodiment" or "an embodiment", "one variant" or "a variant", and "one implementation" or "an implementation" means that a particular element, feature, structure, or characteristic described in connection with the embodiment, variant or implementation is included in at least one embodiment, variant, or implementation. The appearances of such phrases in various places in the specification are not necessarily all referring to the same embodiment, variant, or implementation.

As used herein, the term "computer program" or "software" is meant to include any sequence of human or machine cognizable steps which perform a function. Such program may be rendered in virtually any programming language or environment including, for example, Python, JavaScript, Java, C#/C++, C, Go/Golang, R, Swift, PHP, Dart, Kotlin, MATLAB, Perl, Ruby, Rust, Scala, and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die or distributed across multiple components.

As used herein, the terms "camera" or "image capture device" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A post-processing device, comprising:
a processor; and
a non-transitory computer-readable medium comprising a set of instructions that, when executed by the processor, causes the processor to:
determine a first amount of motion in a first frame of video data;
determine whether the first amount of motion is over a threshold value;
select a first motion blur technique between at least a second motion blur technique or a third motion blur technique based on the determining whether the first amount of motion is over the threshold value;
perform the first motion blur technique on the first frame of video data;
determine a second amount of motion in second frame of the video data;
determine whether the second amount of motion is over the threshold value;
select a fourth motion blur technique between at least the second motion blur technique or the third motion blur technique based on determining whether the second amount of motion is over the threshold value; and
perform the fourth motion blur technique on the second frame of video data.

2. The post-processing device of claim 1, where the fourth motion blur technique is different from the first motion blur technique.

3. The post-processing device of claim 1, where the second motion blur technique is a faster rendering technique compared with the third motion blur technique.

4. The post-processing device of claim 1, where:
the second motion blur technique comprises a vector blur technique, and the third motion blur technique comprises frame interpolation.

5. The post-processing device of claim 1, where determining the first amount of motion in the first frame of video data comprises determining one or more motion vectors associated with motion.

6. The post-processing device of claim 1, where the set of instructions further causes the processor to:
determine contrasting motion in the video data, where selecting the first motion blur technique is further based on the determination of contrasting motion.

7. The post-processing device of claim 1, where the set of instructions further causes the processor to:
receive the video data from a camera device.

8. The post-processing device of claim 1, where performing the first motion blur technique and performing the fourth motion blur technique are based on a selection of a shutter angle.

9. The post-processing device of claim 1, where the set of instructions further causes the processor to:
determine a plurality of sections of the first frame of video data, where performing the first motion blur technique on the first frame of video data comprises performing the first motion blur technique on a first section of the plurality of sections;
select a fifth motion blur technique between at least the second motion blur technique or the third motion blur technique based on a third amount of motion on a second section of the plurality of sections of the first frame of video data;
perform the fifth motion blur technique on the second section of the plurality of sections of the first frame; and
composite each section of the plurality of sections into a composited frame.

10. The post-processing device of claim 9, where the set of instructions further causes the processor to:
feather regions between the plurality of sections of the composited frame.

11. A method of adding motion blur to video data, comprising:
determining a first amount of motion between a first set of consecutive frames of video data;
determining whether the first amount of motion is over a threshold value;
selecting a first motion blur technique between at least a second motion blur technique or a third motion blur technique based on the determining whether the first amount of motion is over the threshold value;
performing the first motion blur technique on at least one frame of the first set of consecutive frames of video data;
determining a second amount of motion between a second set of consecutive frames of video data;
determining whether the second amount of motion is over the threshold value;
selecting a fourth motion blur technique between at least the second motion blur technique or the third motion blur technique based on determining whether the second amount of motion is over the threshold value; and
performing the fourth motion blur technique on at least one frame of the second set of consecutive frames of video data.

12. The method of claim 11, further comprising calculating a plurality of motion vectors of pixel data between the first set of consecutive frames of video data.

13. The method of claim 12, further comprising performing optical flow on the first set of consecutive frames of video data, where calculating the plurality of motion vectors of pixel data is based on performing optical flow.

14. The method of claim 12, where:

performing the first motion blur technique comprises performing a vector blur on the at least one frame of the first set of consecutive frames of video data based on the plurality of motion vectors, and performing the vector blur comprises:

sampling pixel values of image data across a first motion vector of the plurality of motion vectors of pixel data, the first motion vector associated with at least one pixel of the pixel data; and combining a portion of the at least one pixel with the pixel values of image data.

15. The method of claim 12, further comprising performing edge detection on the plurality of motion vectors of pixel data to determine contrasting motion between the first set of consecutive frames of video data.

16. The method of claim 11, where performing the first motion blur technique comprises:

generating one or more intermediate frames between the first set of consecutive frames of video data;

performing a vector blur on the one or more intermediate frames and the at least one frame of the first set of consecutive frames of video data; and stacking the one or more intermediate frames and the at least one frame of the first set of consecutive frames of video data.

17. The method of claim 16, where determining a first amount of motion is based on estimating non-linear motion between the first set of consecutive frames of video data using an artificial intelligence model.

18. A video capture device, comprising:

a sensor configured to capture video data;

a processor; and a non-transitory computer-readable medium comprising a set of instructions that, when executed by the processor, causes the processor to:

determine a first amount of motion in a first frame of video data;

determine whether the first amount of motion is over a threshold value;

select a first motion blur technique between at least a second motion blur technique or a third motion blur technique based on the determining whether the first amount of motion is over the threshold value;

perform the first motion blur technique on the first frame of video data;

determine a second amount of motion in second frame of the video data;

determine whether the second amount of motion is over the threshold value;

select a fourth motion blur technique between at least the second motion blur technique or the third motion blur technique based on determining whether the second amount of motion is over the threshold value; and perform the fourth motion blur technique on the second frame of video data.

19. The video capture device of claim 18, where the set of instructions further causes the processor to add a slow-motion effect on at least a portion of the video data.

20. The video capture device of claim 18, further comprising an inertial measurement unit (IMU), the IMU comprising at least one of an accelerometer, a gyroscope, and a magnetometer, where determining the first amount of motion in the first frame of video data is based on sensor data received from the IMU.

* * * * *